United States Patent
Jerjian

(10) Patent No.: US 12,490,345 B2
(45) Date of Patent: Dec. 2, 2025

(54) PLANAR ELECTRICAL HEATING APPARATUS WITH MODULAR ASSEMBLY

(71) Applicants: ACQUIRE INDUSTRIES LTD, Toronto (CA); Edward Jerjian, Toronto (CA)

(72) Inventor: Edward Jerjian, Toronto (CA)

(73) Assignee: ACQUIRE INDUSTRIES LTD, Toronto (CA)

( * ) Notice: Subject to any disclaimer, the term of this patent is extended or adjusted under 35 U.S.C. 154(b) by 1411 days.

(21) Appl. No.: 16/758,262

(22) PCT Filed: Oct. 23, 2018

(86) PCT No.: PCT/CA2018/051343
§ 371 (c)(1),
(2) Date: Apr. 22, 2020

(87) PCT Pub. No.: WO2019/079893
PCT Pub. Date: May 2, 2019

(65) Prior Publication Data
US 2020/0351990 A1    Nov. 5, 2020

Related U.S. Application Data

(60) Provisional application No. 62/575,771, filed on Oct. 23, 2017.

(51) Int. Cl.
*H05B 3/20* (2006.01)
*H05B 1/02* (2006.01)
(Continued)

(52) U.S. Cl.
CPC ............ *H05B 3/20* (2013.01); *H05B 1/0288* (2013.01); *H05B 3/03* (2013.01); *H05B 3/04* (2013.01); *H05B 3/08* (2013.01); *H05B 2214/02* (2013.01)

(58) Field of Classification Search
None
See application file for complete search history.

(56) References Cited

U.S. PATENT DOCUMENTS

| | | | | |
|---|---|---|---|---|
| 2,469,897 | A | * | 5/1949 | Schilling ............... B23K 11/18 219/56 |
| 4,468,557 | A | * | 8/1984 | Bylin ...................... H05B 3/36 219/535 |

(Continued)

FOREIGN PATENT DOCUMENTS

| | | | |
|---|---|---|---|
| WO | WO-2007075093 A1 * | 7/2007 | ............... H05B 3/04 |
| WO | WO-2008/028470 A2 | 3/2008 | |
| WO | WO-2008/117146 A2 | 10/2008 | |

*Primary Examiner* — Jimmy Chou
(74) *Attorney, Agent, or Firm* — Harness, Dickey & Pierce, PLC

(57) ABSTRACT

The present invention is directed to an electrical heating device, and in particular, a planar electrical heating device and method for assembling the planar electrical heating apparatus. The planar electrical heating apparatus operable using AC or DC power comprising: an outer shell with an upper shell layer joined to a lower shell layer and defining an internal cavity therebetween; a heating element having at least one heating conductor and a first and a second non-heating conductors positionable with the internal cavity, between the upper shell layer and lower shell layer; a first connector end portion secured to the first and second non-heating conductors for coupling to an electrical power supply; a sealing end portion enclosed the connector end portion for electrical isolation and protection from water ingress.

29 Claims, 24 Drawing Sheets

(51) Int. Cl.
*H05B 3/03* (2006.01)
*H05B 3/04* (2006.01)
*H05B 3/08* (2006.01)

(56) References Cited

U.S. PATENT DOCUMENTS

| | | | | |
|---|---|---|---|---|
| 4,517,448 | A * | 5/1985 | Crain | H01L 21/705 |
| | | | | 257/E21.534 |
| 6,054,676 | A * | 4/2000 | Wall | H01L 23/345 |
| | | | | 257/E23.098 |
| 6,073,615 | A * | 6/2000 | Anderson | F28F 9/0234 |
| | | | | 123/549 |
| 6,184,496 | B1 | 2/2001 | Pearce | |
| 2004/0035853 | A1 | 2/2004 | Pais | |
| 2004/0099654 | A1 | 5/2004 | Pais | |
| 2005/0047768 | A1* | 3/2005 | Kuebler | H05B 3/78 |
| | | | | 219/202 |
| 2007/0193996 | A1* | 8/2007 | Nakajima | H05B 3/26 |
| | | | | 219/209 |
| 2008/0261429 | A1* | 10/2008 | Wronski | H05B 3/04 |
| | | | | 439/271 |
| 2014/0131904 | A1* | 5/2014 | Tang | A61M 16/109 |
| | | | | 261/157 |
| 2014/0276545 | A1* | 9/2014 | Krogh Andersen | H05B 3/20 |
| | | | | 604/114 |
| 2015/0041440 | A1* | 2/2015 | Mate | B23K 9/324 |
| | | | | 219/73.2 |
| 2018/0063886 | A1* | 3/2018 | Shearer | H05B 3/0014 |
| 2018/0094434 | A1* | 4/2018 | Gillissen | F24D 13/02 |
| 2020/0011543 | A1* | 1/2020 | Hu | H05B 3/28 |

* cited by examiner

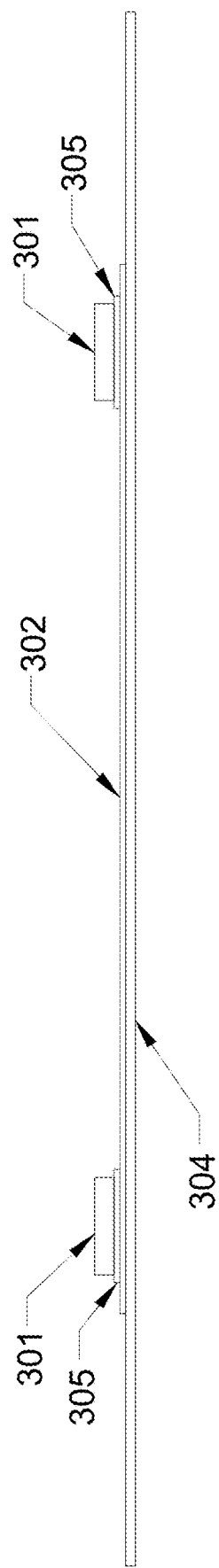
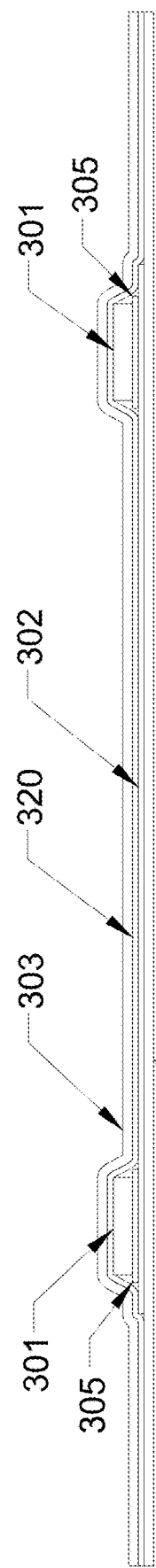

PLANAR ELECTRICAL HEATING APPARATUS WITH MODULAR ASSEMBLY

CROSS-REFERENCE TO RELATED APPLICATIONS

This application is a National Phase Entry of International Patent Application No. PCT/CA2018/051343, filed on Oct. 23, 2018, which claims priority to U.S. Provisional Patent Application No. 62/575,771 filed on Oct. 23, 2017, both of which are incorporated by reference herein.

TECHNICAL FIELD

The described embodiments relate to electrical heating devices, and in particular planar electrical heating devices and methods for assembling planar electrical heating devices.

BACKGROUND

The following is not an admission that anything discussed below is part of the prior art or part of the common general knowledge of a person skilled in the art.

Planar electrical heating devices, such as thin-film heaters and thick-film heaters, are increasingly being used to address specific heating problems for various applications. For example, planar electrical heating devices find applications in diverse sectors such as aerospace, transportation, construction, chemical and food processing industries.

Naylor (US Publication No. 2008/0272106 A1) purports to disclose a grounded heated cover with a first pliable outer layer and a second pliable outer layer, wherein the outer layers provide durable protection, an electrical heating element between the first and the second outer layers, the electrical heating element configured to convert electrical energy to heat energy, a heat spreading layer, and a thermal insulation layer positioned above the active electrical heating element. The heated cover removes ice, snow, and frost from surfaces, wherein the heat generated penetrates soil and other material to thaw the material to a suitable depth. A plurality of heated covers can be connected on a single 120 Volt circuit protected by a 20 Amp breaker.

Pearce (U.S. Pat. No. 6,180,929 B1) purports to disclose a lightweight flexible electrical heating device for melting snow and ice that may be cut in the field to custom length. The device includes a planar flexible electrical heater sandwiched between two vulcanized polymer protective sheets. The heater includes an array of resistive heating elements electrically connected in parallel and oriented substantially across the device length, allowing the heater to be cut to any length as needed.

Industry has faced challenges in manufacturing and assembling large surface area planar electrical heating apparatuses as a replacement for electric heat trace cable with integral grounding layer for electrical safety. The grounding layer over large surface areas can be substantially thick in order to mitigate high leakage conductance. Manufactured planar heating elements are often permanent constructions, connections are made using round wire routed through on the exterior of the shell causing non-planar bulky constructions, connections are exposed without a grounding layer to cover them, and methods of assembly are often non-repairable, messy, and increase manufacturing and/or installation time.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Various embodiments are described herein that generally relate to a planar electrical heating apparatus, an outer shell layer component for a planar electrical heating apparatus, an electric insert component for a planar electrical heating apparatus, methods for assembling a planar electrical heating apparatus and methods for manufacturing a planar electrical heating apparatus.

In preferred embodiments there is provided a heating apparatus that includes an outer shell with an upper shell layer joined to a lower shell layer and defining an internal cavity or chamber therebetween. An electric heating element is positionable within the internal cavity, between the upper layer and lower layer, the heating element with at least one heating conductor, at least two non-heating conductors, and with or without a flexible or substantially rigid substrate. An electric insert is positionable within the internal cavity between one of the shell layers and the heating element, the electric insert configured in an embodiment of the present invention to underlie at least a portion of the outer shell, the insert including a connector having a first connector end portion connectable to an electrical power supply and a second connector end portion connectable to the non-heating conductors. The upper and lower layers can be permanently or detachably attached and sealed to each other or to the upper and lower faces of the heating element at its axial side edges along a majority of the perimeter of the apparatus. The perimeter of the apparatus also includes an unsealed portion defining a receptacle within which the heating element and/or insert are receivable.

In an embodiment of the present invention, the heating apparatus may be a planar electrical heating apparatus.

In an embodiment of the present invention, the outer shell can extend in an axial direction with the axially extending side edges of the upper shell layer permanently or detachably joined to axially extending side edges of the lower shell layer or to the upper and lower faces of the heating element at its axial side edges so as to define the internal cavity/chamber.

In an embodiment of the present invention, the internal cavity may have an inner cavity surface having an upper inner cavity surface facing a lower inner cavity surface, the inner cavity surface can have a first attachment region in which the upper inner cavity surface is permanently or detachably attached to the lower inner cavity surface and a second attachment region in which the upper inner cavity surface is detachably or not attached to the lower inner cavity surface. The first attachment region can include the attachment region in which the upper and lower layers are permanently or detachably attached and sealed to each other or to the upper and lower faces of the heating element at along the majority of the perimeter (e.g. the axially extending side edges).

In an embodiment of the present invention, an upper grounding layer (e.g. foil and dielectric) can be positioned between the upper shell layer and the heating element. An inner surface of the upper grounding layer can define the upper inner cavity surface in the second attachment region. Additionally or alternatively, a lower grounding layer (e.g. foil and dielectric) can be positioned between the lower shell layer and the heating element.

In an embodiment of the present invention, an upper and lower grounding layer can consist of a conductive covering layer and dielectric layer. The outer surface of the conductive layer permanently or detachably attached to the inner surface of the shell layer. The inner surface of conductive layer detachably or not attached to the outer surface of the dielectric layer. An inner surface of the dielectric layer can also define the inner cavity surface in the second attachment region.

In an embodiment of the present invention, the heating element may be securable within the internal cavity when positioned within the internal cavity. The heating element may be secured within the internal cavity in the second attachment region. The inner surface of the dielectric layer of the grounding layer may contact the heating conductor when the heating element is secured within the internal cavity.

In an embodiment of the present invention, the axial side edges of the heating element may be positioned outside the internal cavity secured to the axial side edges of the outer shell layer. The heating element may be secured permanently or detachably in the first attachment region. The grounding layer may contact the heating element when the heating element is secured at the axial side edges of the outer shell layer.

In an embodiment of the present invention, a thermal layer can be positioned between the heating element and the lower shell layer and/or the upper shell layer to provide high or low thermal conductivity, high or low thermal capacitance, and/or high or low transparency to thermal radiation.

In an embodiment of the present invention, the thermal layer can be permanently or removably adhered to the one of the lower shell layer and/or the upper shell layer, but not bonded to the face of the heating element.

In an embodiment of the present invention, a dielectric layer part of the grounding layer can be a thermal layer between the heating element and the lower conductive covering and/or the upper conductive covering layer as part of the lower grounding layer and/or the upper grounding layer.

In an embodiment of the present invention, the thermal and/or dielectric layer may cover substantially the entire face of the heating element.

In an embodiment of the present invention, the thermal and/or dielectric insulating layer may be removable.

In an embodiment of the present invention, an external power connector may extend through an aperture in the lower shell layer and/or the upper shell layer.

In an embodiment of the present invention, an electric insert may extend through an aperture between the inner surface of the lower shell layer and inner surface of the upper shell layer at the axial side edges within the internal cavity for electric connection.

In an embodiment of the present invention, the electric insert may include additional components such as one or more additional power connectors, electric circuits, terminal connectors, one or more sensors and one or more actuators. Each of the power connectors and additional components may extend through separate apertures. In preferred embodiments, the connectors and additional components may extend through an aperture in the lower shell layer or upper shell layer. For example, in portable appliance applications power connectors and/or additional components may be housed within a single junction box, cable gland, molded covering, or membrane switch assembly.

In an embodiment of the present invention, the aperture in the lower shell layer or upper shell layer can overlie the electric insert.

In preferred embodiments, there is provided an electric insert component for a heating apparatus between an outer covering and coplanar with or overlying a heating element positioned with an internal cavity of the outer covering, the heating element including at least one heating conductor and at least two non-heating conductors, or electric leads. The insert component can include a substrate having an electric circuit thereon, the electric circuit including at least one external power connector that is connectable to a power source; and a plurality of coupling components, including first and second terminal coupling components connectable to the electric circuit and to the pair of non-heating conductors, or electric leads; where each terminal coupling component includes a conductive connector that is usable to secure the substrate to the heating element and to electrically couple the electric circuit to one of the non-heating conductors, or electric leads.

In preferred embodiments, there is provided a method of assembling an electrical heating apparatus. The method may include providing a first length of axially extending outer shell layer, the outer shell layer having an axially extending internal cavity; detaching a second length of the outer shell layer from the first length; inserting a heating element into the internal cavity of the second length of outer shell layer; inserting an insert component into the internal cavity of the shorter length of outer shell layer coplanar with or overlying the heating element; forming an aperture in the outer shell layer, the aperture exposing the electric circuit or a power connector provided by the insert component; electrically coupling the insert component and the heating element so that the heating element is connectable to a power source via the power connector; and sealing the terminal coupling components, aperture, and the shorter length of the outer shell layer.

In another preferred aspect of the invention, there is provided a planar electrical heating apparatus operable using AC or DC power comprising: an outer shell with an upper shell layer joined to a lower shell layer and defining an internal cavity therebetween; a heating element having at least one heating conductor and a first and a second non-heating conductor positionable within the internal cavity, between the upper shell layer and lower shell layer; a first connector end portion secured to the first and second non-heating conductors for coupling to an electrical power supply; and a sealing end portion enclosing the connector end portion for electrical isolation and protection from water ingress.

In yet another aspect of the invention, there is provided a planar electrical heating apparatus as noted above wherein the lower shell layer is a surface for installation.

In yet another aspect of the invention, there is provided a planar electrical heating apparatus as noted above wherein the internal cavity further comprises an inner cavity surface having an upper inner cavity surface facing a lower inner cavity surface, the inner cavity surface having a first attachment region in which the upper inner cavity surface is permanently or detachably attached to the lower inner cavity surface and a second attachment region in which the upper inner cavity surface is detachably or not attached to the lower inner cavity surface.

In yet another aspect of the invention, there is provided a planar electrical heating apparatus as noted above, wherein the upper and lower outer shell layers can be permanently or detachably attached and sealed along a portion of a perimeter of the upper and lower inner cavity surface along the first attachment region.

In yet another aspect of the invention, there is provided a planar electrical heating apparatus as noted above, wherein the outer shell comprises an unsealed portion of the perimeter defining a receptacle to the detachably or not attached inner cavity surfaces within which the heating conductor is positionable and non-heating conductors accessible so as to define the second attachment region.

In yet another aspect of the invention, there is provided a planar electrical heating apparatus as noted above wherein the heating element is secured permanently or detachably in the first attachment region between the upper inner shell layer and lower inner layer.

In yet another aspect of the invention, there is provided a planar electrical heating apparatus as noted above wherein the heating element is secured within the internal cavity in the second attachment region between the upper inner and lower inner cavity surfaces.

In yet another aspect of the invention, there is provided a planar electrical heating apparatus as noted above wherein the upper inner cavity surface contacts the heating element when the heating element is secured.

In yet another aspect of the invention, there is provided a planar electrical heating apparatus as noted above further comprising an electric insert receivable and positionable within the internal cavity.

In yet another aspect of the invention, there is provided a planar electrical heating apparatus as noted herein wherein the electric insert comprises a second connector end portion connected to the first and second non-heating conductors and the first connector end portion connected to an electrical power supply.

In yet another aspect of the invention, there is provided a planar electrical heating apparatus as noted herein wherein the electric insert overlies at least a portion of the heating element.

In yet another aspect of the invention, there is provided a planar electrical heating apparatus as noted herein wherein the electric insert is coplanar with the heating element.

In yet another aspect of the invention, there is provided a planar electrical heating apparatus as noted herein wherein the electric insert and/or the first connector end portion extends through an aperture in the upper shell layer and/or the lower shell layer.

In yet a further aspect of the invention, there is provided a planar electrical heating apparatus as noted herein wherein the first connector end portion extends through an aperture between an axial side edges of the upper shell layer or the lower shell layer.

In yet a further embodiment of the invention there is provided a planar electrical heating apparatus further comprising the upper shell layer and/or lower shell layer extended beyond the edges the heating element, the first connector end portion and the sealing end portion, and the upper shell layer and/or lower shell layer folded onto the other or joined onto each other to seal the apparatus over the second length and more preferably wherein the upper shell layer and/or lower shell layer extended beyond the edges the heating element and the electric insert, the first and the second connector end portion and the first and the second sealing end portion, and the upper shell layer and/or lower shell layer folded onto the other or joined onto each other to seal the apparatus over the second length.

In yet a further aspect of the invention, there is provided a planar electrical heating apparatus as noted herein further comprising a thermal layer positioned between the heating element and the outer shell comprised of material having high or low thermal conductivity, high or low thermal capacitance and/or high or low transparency to thermal radiation.

In yet a further aspect of the invention, there is provided a planar electrical heating apparatus as noted herein wherein the thermal layer covers substantially a first planar surface of the heating element.

In yet a further aspect of the invention, there is provided a planar electrical heating apparatus as noted herein comprising a thermal layer positionable within the internal cavity between one of the upper or lower shell layer and the heating element.

In yet a further aspect of the invention, there is provided a planar electrical heating apparatus as noted herein further comprising a plurality of thermal layers positionable within the internal cavity between the upper and lower shell layers and the heating element.

In yet a further aspect of the invention, there is provided a planar electrical heating apparatus as noted herein wherein the thermal layer is permanently or removably adhered to the lower shell layer and the upper shell layer.

In yet a further aspect of the invention, there is provided a planar electrical heating apparatus as noted herein wherein the lower shell layer is a thermal layer.

In yet a further aspect of the invention, there is provided a planar electrical heating apparatus as noted herein further comprising a thermal layer detachably attached to the lower shell layer.

In another aspect of the invention, there is provided an outer shell component for a planar electrical heating apparatus operable using AC or DC power comprising a shell layer providing flame retardance and low relative permittivity (1.20 to 2.50) at the AC frequency of operation.

In yet another aspect of the invention, there is provided a shell layer comprised of material selected from the group consisting of polyethylene terephthalate (PET), polytetrafluoroethylene (PTFE), fluorinated ethylene propylene (FEP) and perfluoroalkoxy (PFA).

In yet another aspect of the invention, there is provided an outer shell component wherein the shell layer as noted herein further comprises a conductive covering layer for grounding or earthing the heating apparatus to prevent electrical shock hazards and fires.

In yet another aspect of the invention, there is provided an outer shell component as noted herein wherein the conductive covering layer is comprises of material selected from the group consisting of metal ink, coating, foil, braid and mesh.

In yet another aspect of the invention, there is provided an outer shell component as noted wherein the conductive covering layer provides electrical continuity to within 0.1 Ohm across the length of the conductive covering layer.

In yet another aspect of the invention, there is provided the outer shell component as noted previously wherein where the DC resistance per unit length of the conductive covering is be equal to or less than of the lowest resistance of the heating conductor per unit length.

In yet another aspect of the invention, there is provided an outer shell component as noted herein wherein the conductive covering further comprises a surface area pattern of open areas, the pattern having a maximum 30% of the surface area pattern being open area over the heating element for providing reduced leakage conductance, increased transparency to thermal radiation, and minimizing EMI shielding.

In yet another aspect of the invention, there is provided an outer shell component as noted above wherein the open areas of the surface area pattern have a maximum aperture diameter up to 39 mil over a central region of the heating element.

In yet another aspect of the invention, there is provided an outer shell component as noted above wherein the grounding layer further comprises a dielectric layer.

In yet another aspect of the invention, there is provided an outer shell component as noted herein wherein the dielectric layer is comprised of a hydrophobic, flame retardant, low density, and low relative permittivity (1.20-2.15) material.

In yet another aspect of the invention, there is provided an outer shell component as noted herein wherein the material of the dielectric layer is selected from the group consisting of nanoporous or microporous fluorinated ethylene propylene (FEP), perfluoroalkoxy (PFA), polytetrafluoroethylene (PTFE) or expanded polytetrafluoroethylene (ePTFE).

In yet another aspect of the invention, there is provided an outer shell component as noted herein wherein the dielectric layer is a thermal layer.

In yet another aspect of the invention, there is provided an outer shell component as noted herein wherein the thermal layer is high or low thermal conductivity, high or low thermal capacitance and/or high or low transparency to thermal radiation.

In yet another aspect of the invention, there is provided an outer shell component as noted herein further comprising a conductive grounding strap in electrical contact and continuity with the conductive layer wherein a maximum voltage drop between the conductive layer and the grounding strap is less than 5% of the rated voltage when the full load current of the heating element is applied at the rated temperature.

In yet another aspect of the invention, there is provided an outer shell component as noted herein further comprising a conductive grounding strap above the conductive covering layer for connection exterior to the internal cavity.

In yet another aspect of the invention, there is provided an outer shell component as noted herein further comprising a conductive grounding strap below the conductive covering layer for connection interior to the internal cavity.

In yet another aspect of the invention, there is provided an outer shell component as noted herein further comprising a second shell layer providing flame retardance, detachably attached and stacked above the shell layer.

In yet another aspect of the invention, there is provided an outer shell component as noted herein wherein the second shell layer is a high-traction surface tread having an impenetrable covering for providing protection from slip and fall and protection from piercing objects.

In yet another aspect of the invention, there is provided an outer shell component as noted herein wherein the second shell layer provides electric functions comprising temperature sensing, force sensing, lighting, power generation or electrical storage.

In yet another aspect of the invention, there is provided a planar electrical heating element component for a planar electrical heating apparatus operable using AC or DC power comprising: a heating conductor, wherein the heating conductor is comprised of an electrically resistive material selected from the group consisting of inks, coatings, elastomerics, concretes, threads, or textiles; a first and second non-heating conductor for connecting to a source of electrical supply, wherein the non-heating conductor material is a metal selected from the group consisting of inks, coatings, foils, busbars, inks, coatings, wires and threads.

In yet another aspect of the invention, there is provided a planar electrical heating element component as noted herein wherein the heating conductor is comprised of a material having a first phase of varying resistance with temperature providing a self-regulation function and a second phase of infinite resistance with temperature providing a permanent open circuit condition.

In yet another aspect of the invention, there is provided a planar electrical heating element component as noted herein further comprising a second heating conductor and a third and fourth non-heating conductor connectable to the first or second non-heating conductors to provide for various power distribution arrangements operable at a rated surface power flux density.

In yet another aspect of the invention, there is provided a planar electrical heating element component as noted herein wherein the second and the third non-heating conductors are connected and the first and the fourth non-heating conductor provide for a series connection and a single phase power distribution arrangement operable at the rated surface power flux density.

In yet another aspect of the invention, there is provided a planar electrical heating element component as noted herein wherein the first and third non-heating conductors are connected and the second and the fourth non-heating conductors are connected to provide for a parallel connection and a single power distribution arrangement operable at the rated surface power flux density between the connected first and third conductors and between the connected second and fourth non-heating conductors.

In yet another aspect of the invention, there is provided a planar electrical heating element component as noted herein wherein the second and third non-heating conductors are connected to provide for a two phase power distribution arrangement operable at the rated surface power flux density between the first and the connected second/third non-heating conductors and the connected second/third non-heating conductors and the fourth non-heating conductor.

In yet another aspect of the invention, there is provided a planar electrical heating element component as noted herein further comprising a second heating conductor and a third and fourth non-heating conductor stacked vertically and electrically isolated from the first heating conductor wherein the second heating conductor may be alternatively and separately operated at a different surface power flux density at the rated AC or DC voltage of the first heating conductor.

In yet another aspect of the invention, there is provided a planar electrical heating element component as noted herein further comprising an electrically resistive non-heating conductor having a varying resistance with temperature stacked vertically on the upper or lower insulating layer and a first and second conductor wherein the resistance between first and second conductor may be used to determine temperature of the heating conductors.

In yet another aspect of the invention, there is provided an electric insert component for a planar electrical heating apparatus that may be flexible or substantially rigid, comprising: an electric circuit with an upper and lower insulating layer and a first and second non-heating conductor thereon or therewithin; a first connector end portion that is connectable to the first and second non-heating conductors of the electric circuit and a source of power; a second connector end portion connectable to the first and second non-heating conductors of the electric circuit; a sealing end portion enclosing the connector end portions for electrical isolation and protection from water ingress.

In yet another aspect of the invention, there is provided an electric insert component as noted herein further comprising a third non-heating conductor for coupling to conductive covering or grounding strap.

In yet another aspect of the invention, there is provided an electric insert component for a planar electrical heating apparatus further comprising a first connector end portion connectable to the third non-heating conductor and a source of power In yet another aspect of the invention, there is provided an electric insert component for a planar electrical heating apparatus further comprising a second connector end portion connectable to a conductive covering or a grounding strap.

In yet another aspect of the invention, there is provided an electric insert component for a planar electrical heating apparatus as noted herein wherein the non-heating conductors may be perpendicular to the edges and surfaces of the electric insert.

In yet another aspect of the invention, there is provided an electric insert component for a planar electrical heating apparatus as noted herein wherein the non-heating conductors may be parallel and extend continuously along the length of the electric insert.

In yet another aspect of the invention, there is provided an electric insert component for a planar electrical heating apparatus as noted herein wherein the upper and lower insulating layers may be perforated between the first and second non-heating conductors for tearing and inserting the second connector end-portions.

In yet another aspect of the invention, there is provided an electric insert component for a planar electrical heating apparatus as noted herein wherein the connector end portion comprises a terminal connector.

In yet another aspect of the invention, there is provided an electric insert component for a planar electrical heating apparatus as noted herein wherein the terminal connector is a metal foil or die-cut foil piercing connector rated for a current density equal to or less than the full load current of the non-heating conductors per cross sectional area at the rated temperature.

In yet another aspect of the invention, there is provided an electric insert component for a planar electrical heating apparatus as noted herein wherein the terminal connector of the first connector end portion is connectable mechanically and/or through soldering or brazing.

In yet another aspect of the invention, there is provided an electric insert component for a planar electrical heating apparatus as noted herein wherein the terminal connector of the first connector end portion is connectable mechanically.

In yet another aspect of the invention, there is provided an electric insert component for a planar electrical heating apparatus as noted herein wherein the sealing end portion is secured attachably and sacrificially detachable around the connector end portion.

In yet another aspect of the invention, there is provided an electric insert component for a planar electrical heating apparatus as noted herein wherein connector end portion is sealed using flame retardant self-fusing pressure sensitive adhesive tapes or heat sealing materials.

In yet another aspect of the invention, there is provided an electric insert component for a planar electrical heating apparatus further comprising a junction box, side entry gland, or molded covering enclosing the first connector end portion and/or additional components for coupling to an external power source.

In yet another aspect of the invention, there is provided an electric insert component for a planar electrical heating apparatus further comprising sealing end portion for attaching the junction box, side entry gland or molded covering to electric circuit and/or the planar electrical heating apparatus.

In yet another aspect of the invention, there is provided an electric insert component for a planar electrical heating apparatus as noted herein wherein the junction box, side entry gland, or molded covering provides strain relief for coupling to a power cable.

In yet another aspect of the invention, there is provided an electric insert component for a planar electrical heating apparatus as noted herein wherein the junction box or molded covering provides a securable coupling connectable to a power cable terminated with a securable coupling of the opposite gender.

In yet another aspect of the invention, there is provided an electric insert component for a planar electrical heating apparatus as noted herein wherein the molded covering is the sealing end portion.

In yet another aspect of the invention, there is provided an electric insert component for a planar electrical heating apparatus as noted herein wherein the junction box comprises a terminal connector block assembly.

In yet another aspect of the invention, there is provided an electric insert component for a planar electrical heating apparatus as noted herein wherein the terminal block assembly comprises a terminal connector with foil terminal connector end portion and barrel connector end portion.

In yet another aspect of the invention, there is provided an electric insert component for a planar electrical heating apparatus as noted herein further comprising: an electric control circuit and a first and second conductor; one or more electric sensors and one or more electric actuators connectable to the first and second conductor of the electric control circuit; a connector end portion that is connectable to the first and second conductors of the electric control circuit and controller;

In yet another aspect of the invention, there is provided an electric insert component for a planar electrical heating apparatus as noted herein further comprising a junction box or membrane switch housing the connector end portion and/or additional components for coupling to a controller for controlling the operation of the heating element.

In yet another aspect of the invention, there is provided an electric insert component for a planar electrical heating apparatus as noted herein wherein the controller may be connectable within the junction box or membrane switch assembly.

In yet another aspect of the invention, there is provided an electric insert component for a planar electrical heating apparatus as noted herein wherein the controller may be connectable externally in-line or at the end of the external power cable for controlling the operation of the heating element.

In yet another aspect of the invention, there is provided an electric insert component for a planar electrical heating apparatus as noted herein wherein the electric sensors may be provided for surface temperature, ambient temperature, relative humidity, precipitation/moisture, line current, leakage current, and force measurements.

In yet another aspect of the invention, there is provided an electric insert component for a planar electrical heating apparatus as noted herein wherein the electric actuators are provided for operating inputs and displaying outputs on/off state, surface temperature, ambient temperature, relative humidity, precipitation/moisture, line current, leakage current, power consumption, and control settings.

In yet another aspect of the invention, there is provided an electric insert component for a planar electrical heating apparatus as noted herein further comprising a controller with antenna for wireless transmission of sensor and actuator outputs for remote control of operating inputs.

In yet another aspect of the invention, there is provided a method of assembling a planar electrical heating apparatus of any one of claims 1 to 23, the method comprising: (a) providing a first and second length of an axially extending outer shell layer, the outer shell layer having an axially extending internal cavity; (b) detaching the second length of the outer shell layer from the first length to expose the internal cavity; (c) electrically coupling the heating element and non-heating conductors of an electric insert component to a power source via the connector end portion; (d) sealing the connector end portion with a sealing end portion; and (e) sealing the second length of the outer shell layer.

In yet another aspect of the invention, there is provided a method further comprising inserting the heating element into the internal cavity of the second length of outer shell layer before step (c).

In yet another aspect of the invention, there is provided a method further comprising between step (b) and (c), (b1) forming an aperture in the outer shell layer to expose the electric circuit, the first connector end-portion, and/or an external connector.

In yet another aspect of the invention, there is provided a method further comprising between step (b1) and (c) inserting the electric insert component into the internal cavity of the second length of outer shell layer.

In yet another aspect of the invention, there is provided a method further comprising electrically coupling the electric insert component and the heating element so that the heating element is connectable to the electric insert component via a second connector end portion and to a power source via the first connector end portion.

In yet another aspect of the invention, there is provided a method further comprising sealing the second connector end portion.

In yet another aspect of the invention, there is provided a method further comprising forming an aperture in the outer shell layer after detaching a second length of the outer shell layer from the first length.

In yet another aspect of the invention, there is provided a method further comprising passing the electric circuit of the insert component through the aperture in the outer shell layer.

In yet another aspect of the invention, there is provided a method further comprising coupling the first connector end portion to the electric circuit after passing through the aperture.

In yet another aspect of the invention, there is provided a method further comprising passing the first connecting end portion of the insert component through the aperture in the outer shell layer.

In yet another aspect of the invention, there is provided a method further comprising passing the exposed connector of the electric insert component through the aperture in the outer shell layer.

In yet another aspect of the invention, there is provided a method further comprising sealing the electric insert component using the sealing end portion and securing the electric insert to the inner cavity surface of the outer shell.

In yet another aspect of the invention, there is provided a method further comprising sealing the electric insert component using the sealing end portion and securing the first connector end-portion to the outer surface of the outer shell.

In yet another aspect of the invention, there is provided a method further comprising sealing the electric insert component using the sealing end portion and securing the exposed connector to the outer surface of the outer shell.

In yet another aspect of the invention, there is provided a method further comprising between steps (b) and (c) forming an aperture between outer shell layers after detaching a first and second length of the outer shell layer and passing the electric insert through the aperture between outer shell layers.

In yet another aspect of the invention, there is provided a method further comprising inserting a sealing end portion around the aperture between the outer shell layer and electric insert.

In yet another aspect of the invention, there is provided a method further comprising before step (c) detaching the second length and a portion of the first length of the upper and/or the lower shell layer, cutting the heating element, any thermal layers, any dielectric layers, and one or neither of the outer shell layers before electrically coupling the heating element.

In yet another aspect of the invention, there is provided an electric insert component for a planar electrical heating apparatus as noted herein wherein step (e) further comprises folding onto the other or joining onto each other the upper and/or lower shell layer to seal the apparatus over the second length after sealing the connector end portion.

These and other aspects and features of various embodiments will be described in greater detail below.

BRIEF DESCRIPTION OF THE DRAWINGS

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

For a better understanding of the described embodiments and to show more clearly how they may be carried into effect, reference will now be made, by way of example, to the accompanying drawings.

FIGS. 3A, 3B, 3C, 3D, 3E and 3F are diagrams illustrating cross-sectional side views of a heating element that may be used with the electrical heating apparatuses of FIG. 1 in accordance with example embodiments.

DETAILED DESCRIPTION

Figure 1A:
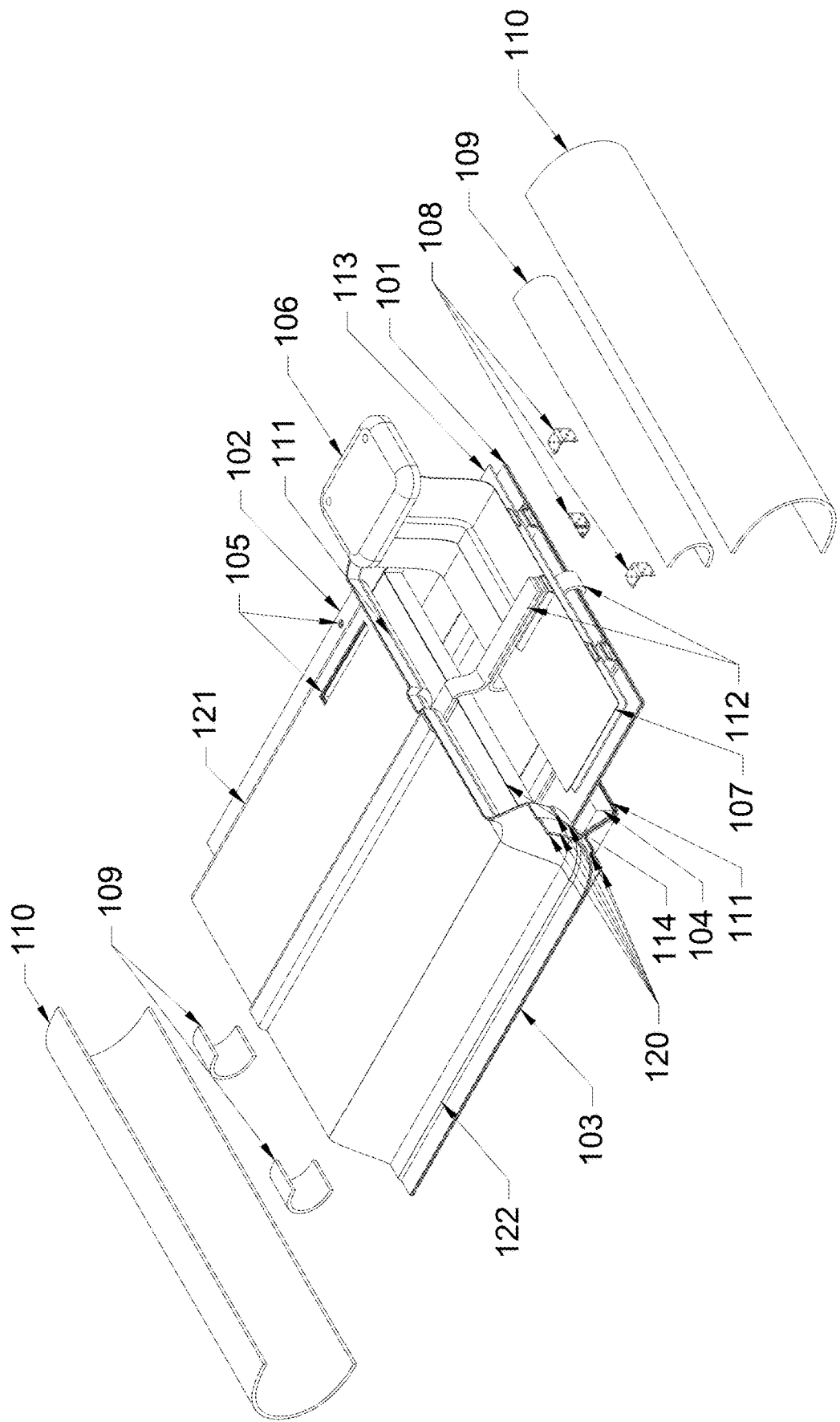
FIGS. 1A, 1C and 1E are diagrams illustrating exploded perspective views of electrical heating apparatuses in accordance with example embodiments.

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well known methods, procedures and components have not been described in detail so as not to obscure the embodiments described herein. Also, the description is not to be considered as limiting the scope of the embodiments described herein.

Advances in materials science and nanotechnology are leading to new forms of electric heating elements. Large surface area heating elements are being manufactured with thin profiles or as free-form objects and using materials that may be flexible or substantially rigid and intended to replace electric heat trace cable and applications thereof. Examples of heating elements being developed include heating elements that use materials such as conductive inks, coatings, elastomerics, concretes, and even woven/non-woven fabrics. These heating elements may be manufactured in large-scale, for instance in rolls and/or sheets. For example, electrically resistive carbon nanotube (CNT) ink materials may be used to print large-surface area resisitive heating films that can be manufactured roll-to-roll. In other example, high electrical conductivity copper or silver inks materials may be used to print inductive heating films that can be manufactured in sheets.

These electric heating elements may provide increased versatility and allow for use in different applications. For example, these electric heating elements may be integrated into heating assemblies in industries such as construction, transportation, and consumer appliances. However, these electric heating assemblies tend to be highly customized to the particular implementation. As a result, specific heating assemblies are constantly designed based on the installation location and application.

For example, the components used in heating assemblies may be specifically selected based on their intended use and requirements. In some cases, the heating element may not meet the flammability properties based on the requirements of the intended use. In some cases, additional components such as thermal layers, electrical insulation layers, and conductive coverings may be selected depending on the requirements and what is readily available. Generally, these assemblies by not be easily repairable, and may be unalterable given the specialized nature of their construction. For example, in room heating applications a conductive covering is typically assembled separately and may result in nuisance tripping after construction. The electric circuitry and wiring associated with the assembly may also be imbedded in the assembly at the manufacturing stage resulting in circuitry that cannot be accessed or repaired such as when used in applications within concrete. The electrical circuitry and wiring may be attached to the exterior of the assembly resulting in bulky connections which can introduce dangers such as tripping when used in applications such as connecting overground mats together for driveway heating.

In a preferred embodiment of the present invention, there is provided planar electrical heating systems, apparatuses and assemblies for customized application criteria containing a plurality of layers.

In a preferred embodiment of the present invention, there is provided planar electrical heating systems, assemblies and apparatuses for connecting low profile installations containing electric insert circuitry.

Embodiments described herein generally relate to electrical heating systems, assemblies, apparatuses and components therefor. Embodiments described herein may also provide methods for manufacturing electrical heating systems, assemblies and apparatuses (or components) and methods for assembling them. Some of the embodiments described herein may address one or more of the above-noted problems associated with existing applications, systems, assemblies of electrical heating elements. Embodiments described herein may also be used to provide electrical heating apparatuses for various industries and applications for fixed-location installations or as portable appliances. Some applications include over/under floor coverings, over/under pavements, over/under roofing, in-ceilings, around pipes and vessels, in/over/around equipment or containers, in/over/under transportation vehicles or trailers, and for personal heating such as mats, blankets and clothing.

Embodiments described herein may facilitate modular assembly of electrical heating apparatuses using planar electrical heating elements. An outer shell may be provided that defines an internal cavity within which the connections of a heating element may be positioned. In general, the perimeter of the outer shell is permanently or detachably sealed with the exception of an unsealed receiving portion that is shaped to receive an electrical insert and make connections. The outer shell may be provided in various shapes depending on the particular implementation. For example, the outer shell may be provided as triangular shell, rectangular shell, oval shell etc. depending on the characteristics of the installation.

In an embodiment of the present invention, the shell element may generally extend in an axial dimension. For instance, the shell may have a substantially rectangular geometry and extend in a lengthwise direction. This may facilitate large-scale manufacturing and distribution on rolls. The axial side edges of the shell can be permanently or detachably sealed to define the internal cavity.

For simplicity and ease of exposition, the example embodiments described herein may be described in reference to a substantially rectangular heating apparatus having a rectangular outer shell. However, a skilled reader will appreciate that the shape of the example heating apparatuses described herein are not to be limited to rectangular, and other shapes may also be used. For simplicity and ease of exposition, the example embodiments described herein may also be described in reference to a flexible electric resistance heat trace element, which may be manufactured as a roll. A desired dimension of series or parallel heating element may be positioned and secured within the inner cavity to provide a covered or protected heating element. As described herein below, the circuit topology of the heating element may be selected to allow the heating element to accommodate the shape of the shell while still ensuring that the heating element traces retain electrical continuity. In an embodiment of the present invention, the covered heating element (i.e. the shell and heating element) may be manufactured together as a roll.

The heating element may be a thick-film or thin-film electric heat trace element, which may be manufactured as a roll. A desired dimension of heating element may be positioned and secured within the inner cavity to provide a covered or protected heating element. As described herein below, the circuit topology of the heating element may be selected to allow the heating element to accommodate the shape of the outer shell while still ensuring that the heating element traces retain electrical continuity. In an embodiment of the present invention, the covered heating element (i.e. the outer shell and heating element) may be manufactured together as a roll.

An electric insert may also be provided. For simplicity and ease of exposition, the example embodiments described herein may also be described in reference to a planar insert, which may include insert circuitry that is electrically connectable to the heating element. The insert circuitry may include power and/or control circuits. In an embodiment of the present invention, the flexible insert may also include one or more external connectors. The external connectors may be electrically connectable to a power source and/or an external controller.

The planar electric insert may be positioned within the internal cavity with the insert circuitry electrically connected to the heating element. For example, the insert may be positioned between an inner layer of the shell and the heating element. One or more connectors may extend through the shell or between the lower shell layer and the upper shell layer to provide a connection to other heating apparatuses, an external power source and/or controller.

The use of a planar electric insert may enable the heating apparatus to be customized during assembly on site for a particular installation. A length of covered heating element may be selected on-site during an installation, and the insert can be easily placed into or inserted into the cavity. This may facilitate installation and provide a planar electrical heating apparatus with a less bulky profile and avoid loose external wires. As well, the outer shell may protect electric components of the insert from environmental conditions such as direct water contact, moisture and humidity.

In preferred embodiments, the electric insert may be removable from the heating apparatus. This may facilitate repairing or replacing components in the heating apparatus, even after installation.

Referring now to FIG. 1, shown therein is an example embodiment of an electrical heating apparatus 100. It will be understood that different embodiments of the present invention are shown in FIGS. 1A to 1F. Similar elements of these embodiments are identified with the same reference numerals. As shown in the example of FIGS. 1A to 1D, the heating apparatus 100 includes an outer shell 120, a heating element 101, and an insert 107. FIGS. 1A, 1C and 1E show partially exploded perspective views of the heating apparatus 100. FIGS. 1B, 1D, and 1F show cross-sectional views of the heating apparatus 100.

Embodiments of heating apparatus 100 may provide either a fixed or portable electrical heating apparatus. For example, thin and flexible materials may be used to manufacture and assemble heating apparatus 100 allowing for easy installation in fixed locations or as portable appliances.

As well, embodiments of heating apparatus 100 may be assembled in a modular manner. This may allow different configurations of the various components of heating apparatus 100 (e.g. the shell 120, heating element 101, conductive covering layer 111, thermal/dielectric layer 104/114, insert 107 and couplings 108) to be manufactured, assembled, and even interchanged depending on the particular implementation, installation, etc.

The heating element 101 may include a plurality of resistive or inductive heating conductors without a substrate or with, or on, a substrate. The heating element 101 may be manufactured using various materials such as conductive inks, coatings, elastomerics, concretes, and even woven/non-woven fabrics. For example, in preferred embodiments a conductive ink or coating may be deposited on a surface of a substrate in a defined pattern to provide the resistive or inductive heating conductors of the heating element 101. In other embodiments, conductive fabrics may even be integrated into the substrate material (e.g. woven into the substrate) to provide resistive heating elements.

The resistive heating conductors of the heating element 101 may be manufactured of materials that are self-regulating with variable resistance in relation to temperature, or regulated with fixed resistance in relation to temperature.

Figure 3A:
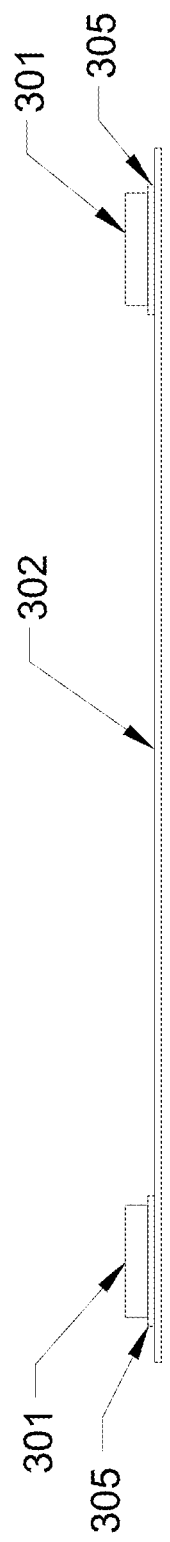
Figure 3B:
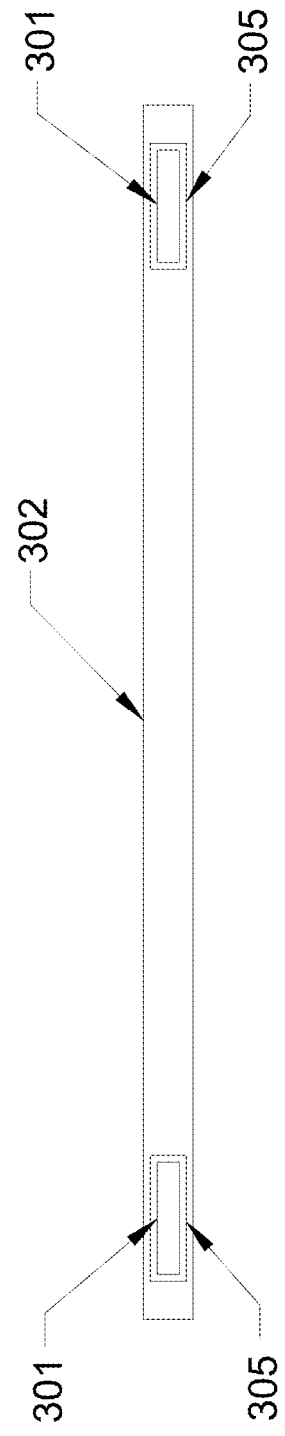
Figure 3E:
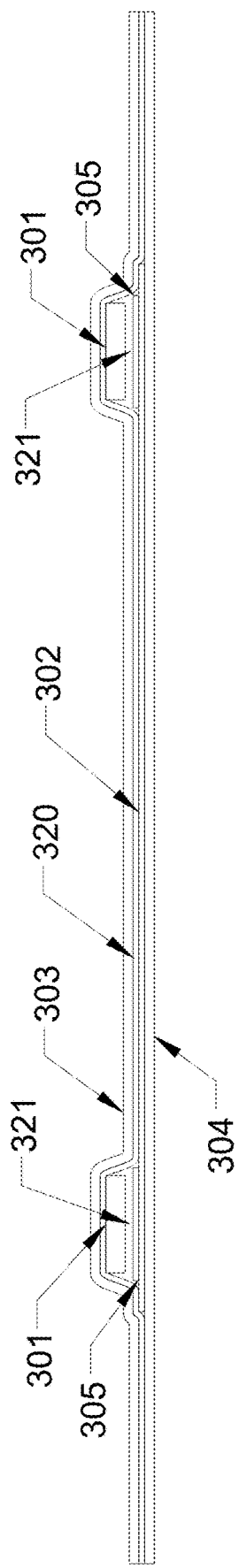
Figure 3F:
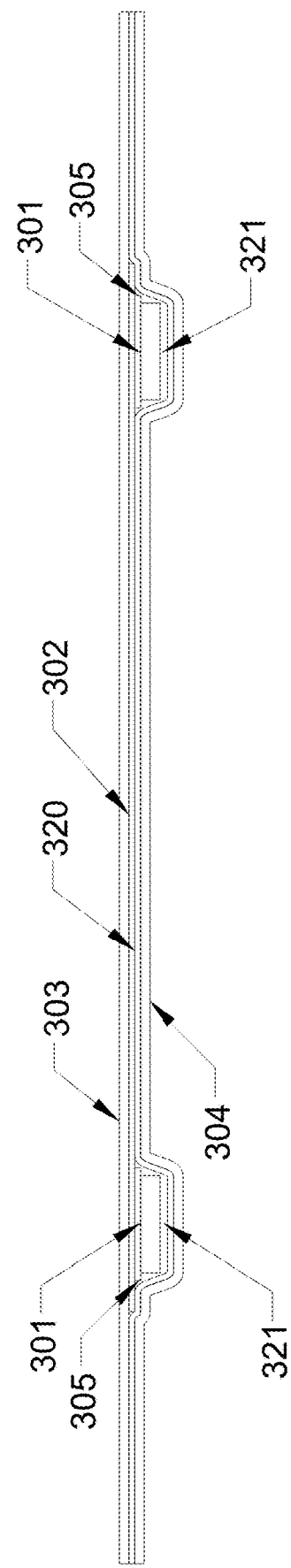
Figure 3G:
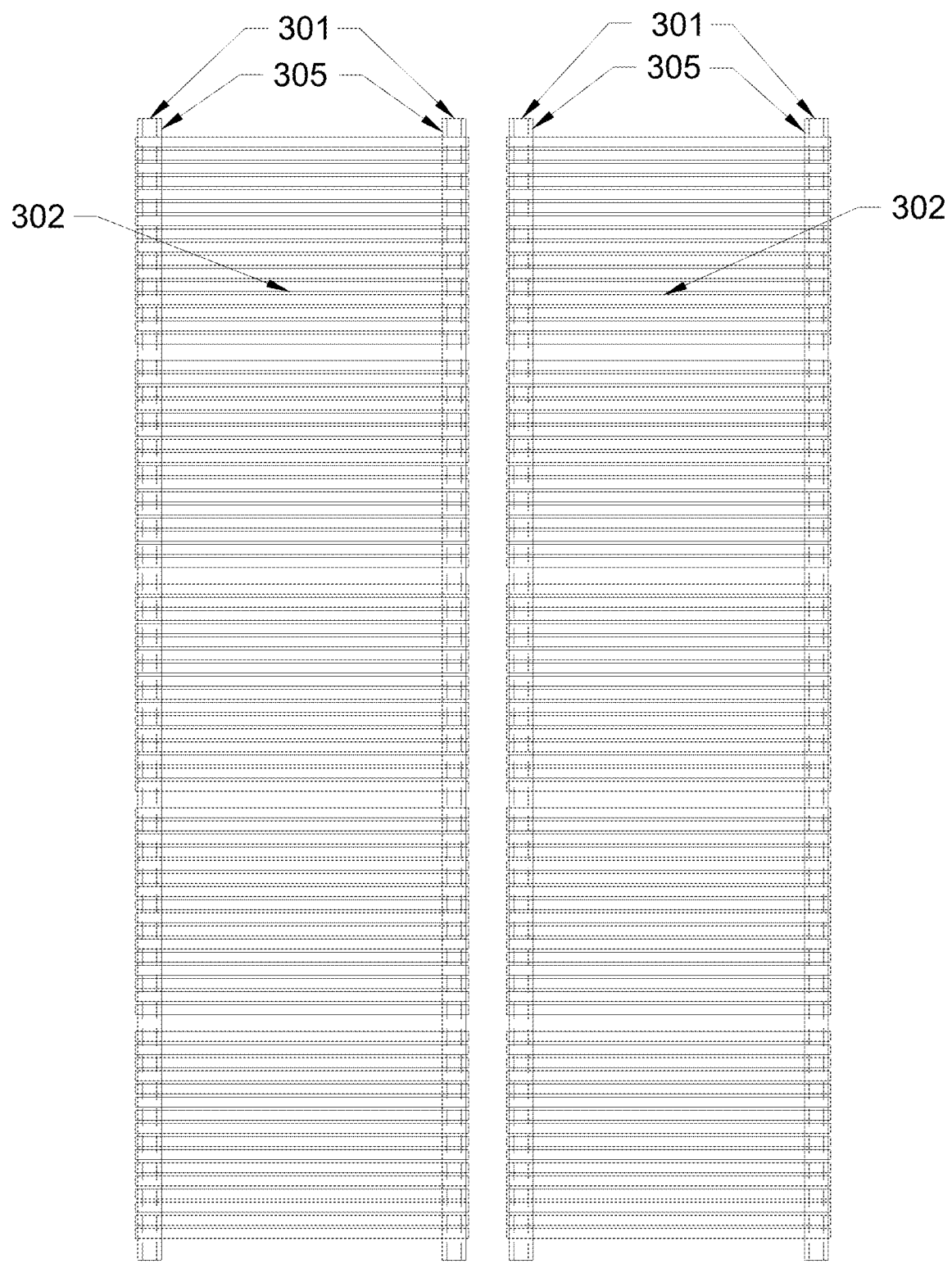
FIGS. 3G, 3H, and 3J are diagrams illustrating plan views of example embodiments of circuit patterns that may be used with the heating element of FIGS. 3A, 3B, 3C, 3D, 3E, and 3F, in accordance with example embodiments.
Figure 3H:
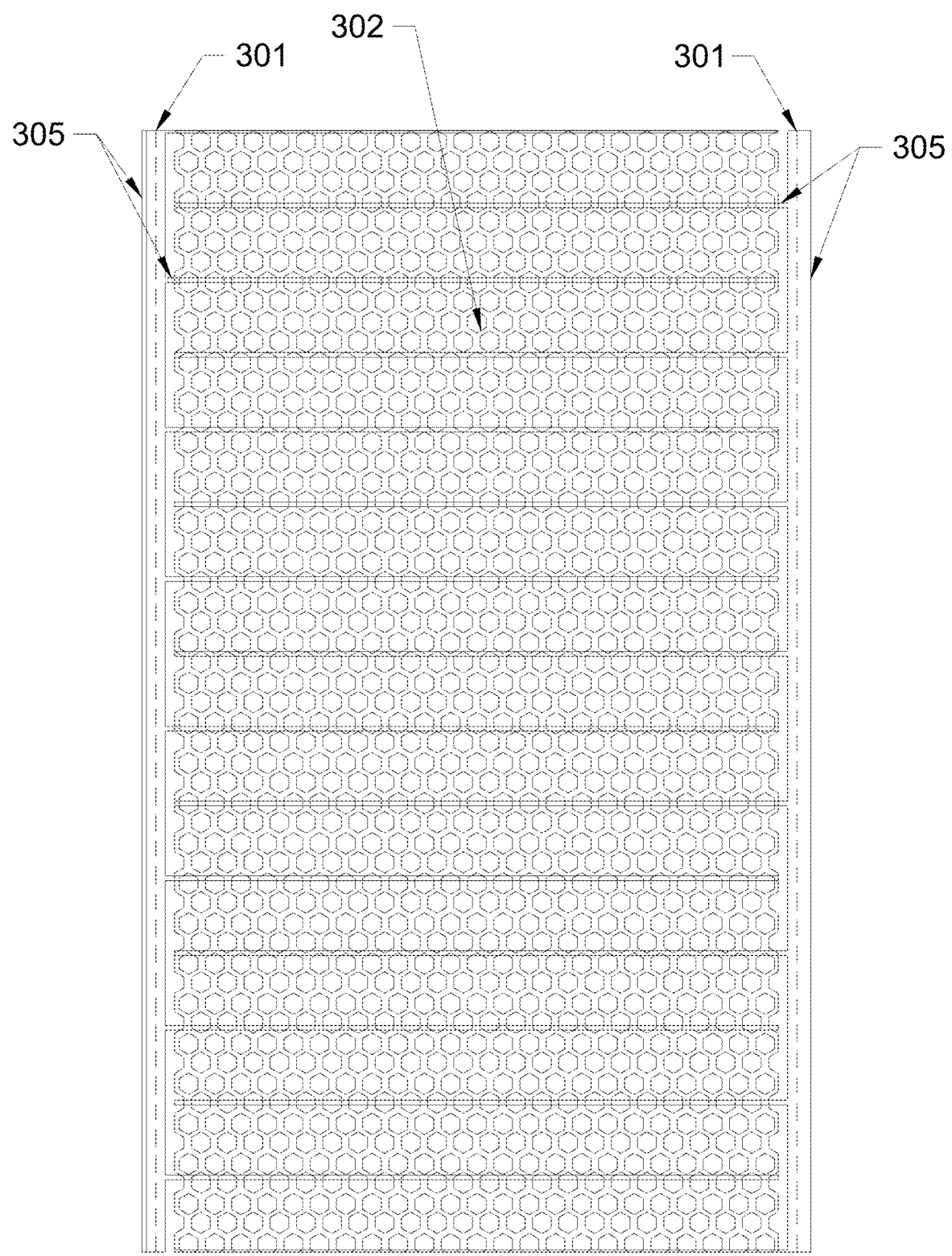
Figure 3J:
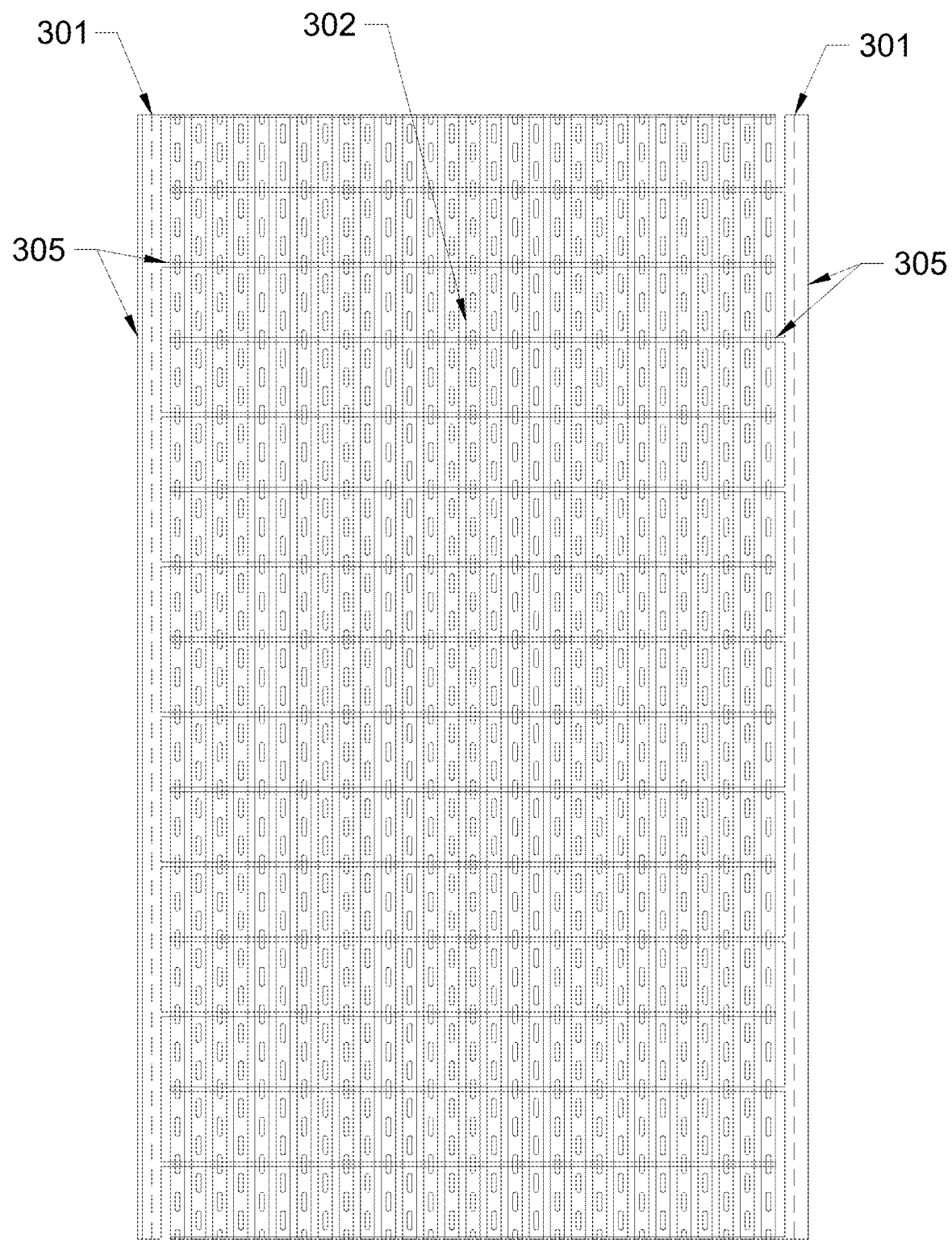

The resistive or inductive heating conductors of the heating element 101 may be arranged into defined circuit patterns to facilitate shaping of the heating element 101. Referred example resistive circuit topologies that may facilitate shaping the heating element 101 are shown in FIGS. 3G, 3H and 3J.

The heating element 101 can have a generally planar shape. That is, the heating conductors may be substantially co-planar with the substrate, or have a minimal elevation over the surface of the substrate. For example, a woven electrically resistive mesh or scrim may be upwards of 62.5 mil in height. This can provide a relatively compact resistive heating element 101. In other examples, a cast electrically resistive concrete heating element may provide a plurality of generally planar surfaces of different surface textures, dimensions and orientations. This may also provide an opportunity for a planar electrical heating apparatus consistent with the embodiments described herein.

In an embodiment of the present invention, the heating element 101 may be flexible. For instance, the substrate and resistive or inductive heating conductors may be manufactured from flexible materials. Accordingly, the heating element 101 may flex to facilitate manufacturing and/or non-planar installations.

Alternatively, the heating element 101 may be substantially rigid. This may help ensure that the heating element 101 does not flex or become dislodged after installation. This may be particularly useful in the case of conductive woven/non-woven fabric heating elements.

In an embodiment of the present invention, the heating element 101 may be flame retardant. For instance, the substrate may be manufactured from materials with additives that extinguish and minimize the spread of a flame. Accordingly, the heating element 101 may facilitate the flammability requirements for certain installations well known in the art.

In an embodiment of the present invention, the heating element 101 may not be flame retardant. For instance, the substrate of the heating element may be manufactured from materials that spread a flame and result in ignited drippings. Accordingly, the heating element 101 itself may not meet the above noted flammability requirements but the outer shell 120 may provide such flammability requirements so as to facilitate or meet the flammability requirements of the entire heating apparatus 100, particularly for certain installations (e.g. in room heating constructions, including but not limited to, under floor installations).

In various embodiments, the heating element 101 can be electrically powered by AC or DC currents. Current can pass through the resistive or inductive heating conductors which dissipates the electrical energy as heat or magnetic flux. This provides the heating function of the heating element 101. The heating element 101 can also include non-heating conductors, or heating element leads, that are connectable to power and/or control circuits, which can in turn be connected to a power source and/or external control circuitry. An example embodiment of a heating element 300 that may be used for the heating element 101 is described in further detail below with reference to FIG. 3.

The outer shell 120 can be used to enclose the heating element 101. In preferred embodiments, the shell 120 may provide a covering enclosing the heating element 101 that may protect the heating element 101 from damage that may be caused by environmental conditions. In preferred embodiments, the outer shell 120 may also include electrical protection layers, such as conductive covering layers 111, to ground the heating element 101.

In general, the outer shell 120 includes an upper layer 102 and a lower layer 103. The inner surface 126 of the upper layer 102 faces the inner surface 127 of the lower layer 103. The upper layer 102 and lower layer 103 can be joined along the majority of the perimeter of outer shell 120 to define an internal cavity. Alternatively, the upper layer 102 and lower layer 103 can be joined along the majority of the perimeter of heating element 101 to define an internal cavity containing the connections for the heating element. The upper layer 102 and lower layer 103 can be left unsealed (or detachably attached) for a portion of the perimeter to define an insert receiving space. First attachment regions 121' and 122' are provided in which an inner surface can be permanently or detachably attached to a lower surface along the majority of the perimeter of outer shell 120. A second attachment region 123' is provided in which a upper inner surface may be detachably attached or not attached to a lower surface.

Figure 1B:
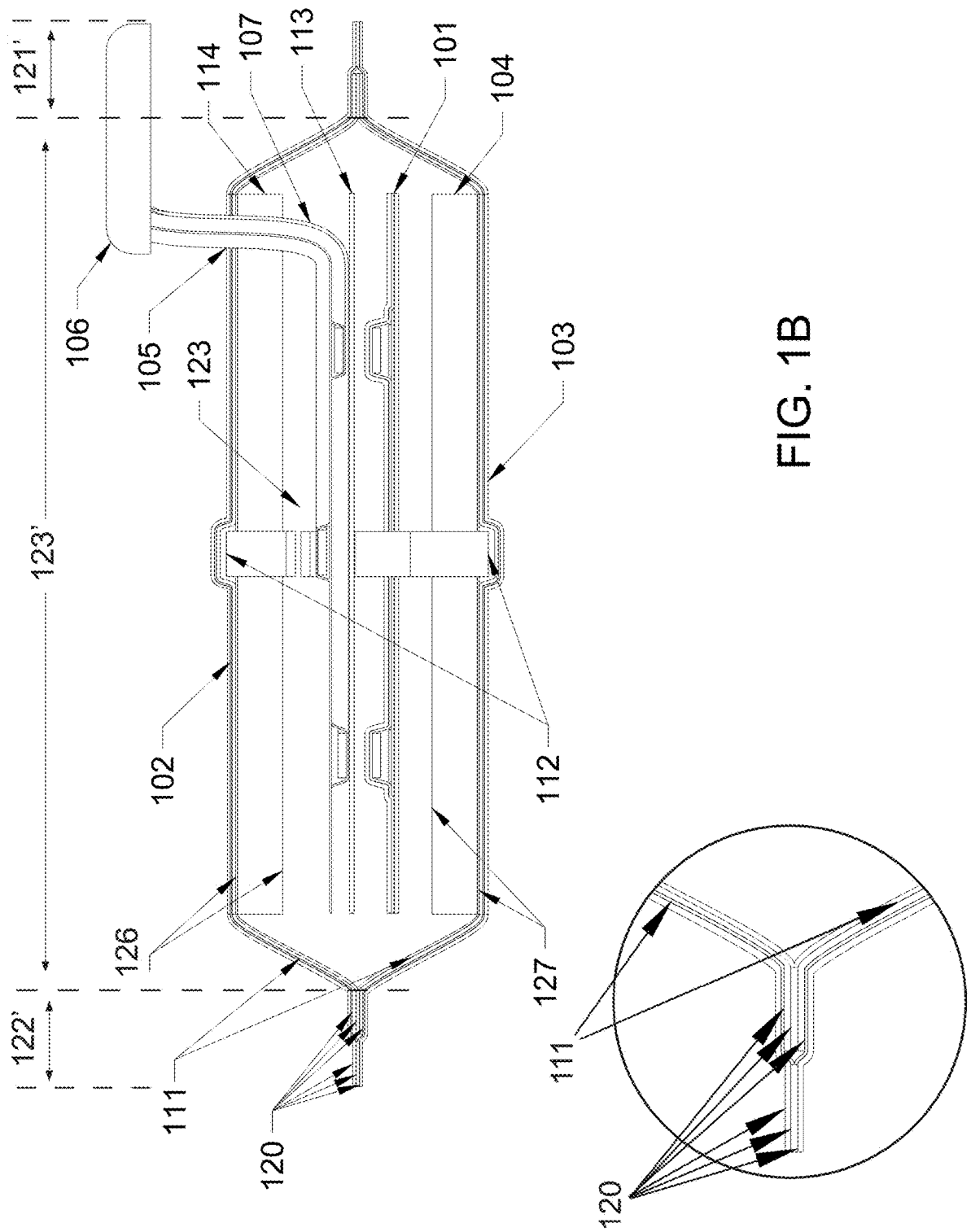
FIG. 1B, 1D, 1F are diagrams illustrating cross-sectional side views of the electrical heating apparatuses of FIGS. 1A, 1C and 1E.
Figure 1C:
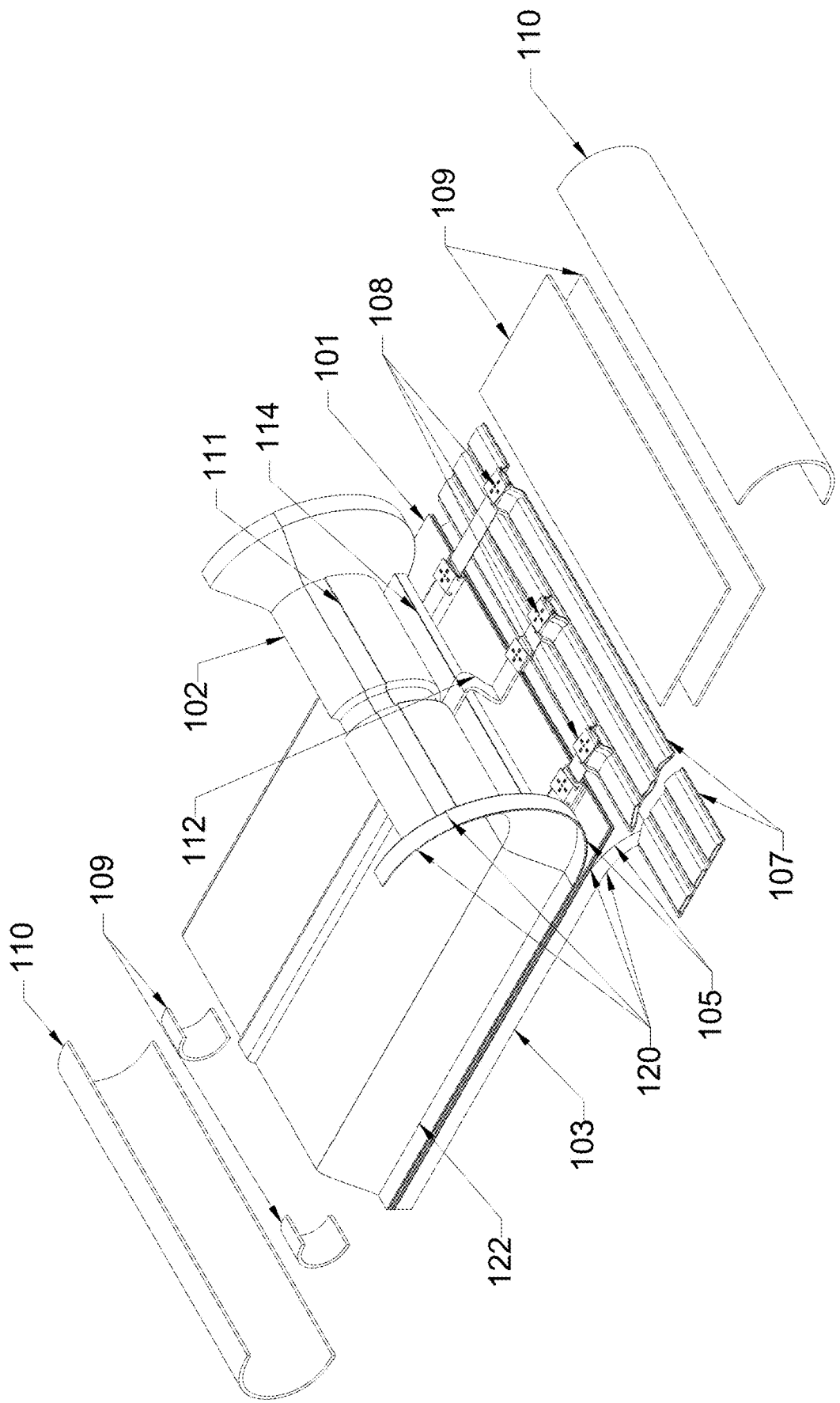

For example, where the outer shell 120 is rectangular, the upper layer 102 and lower layer 103 can be joined at their axial side edges 121 and 122 to define an internal cavity of the outer shell 120 as shown in FIGS. 1A and 1C. The heating element 101 can be positioned in the internal cavity of the outer shell 120.

Alternatively, the upper layer 102 and lower layer 103 can be joined at the axial side edges 121 and 122 of the heating element to define an internal cavity of the outer shell 120 as shown in FIG. 1B. The heating element 101 connections can be positioned in the internal cavity of the outer shell 120.

Figure 1D:
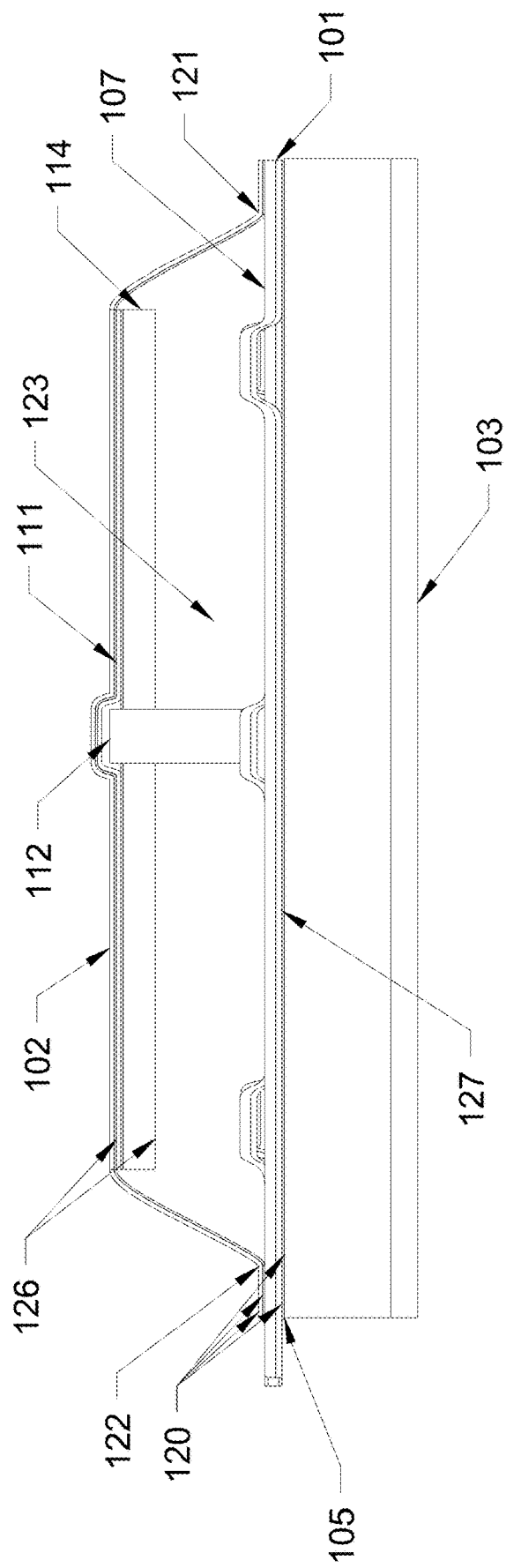
Figure 1E:
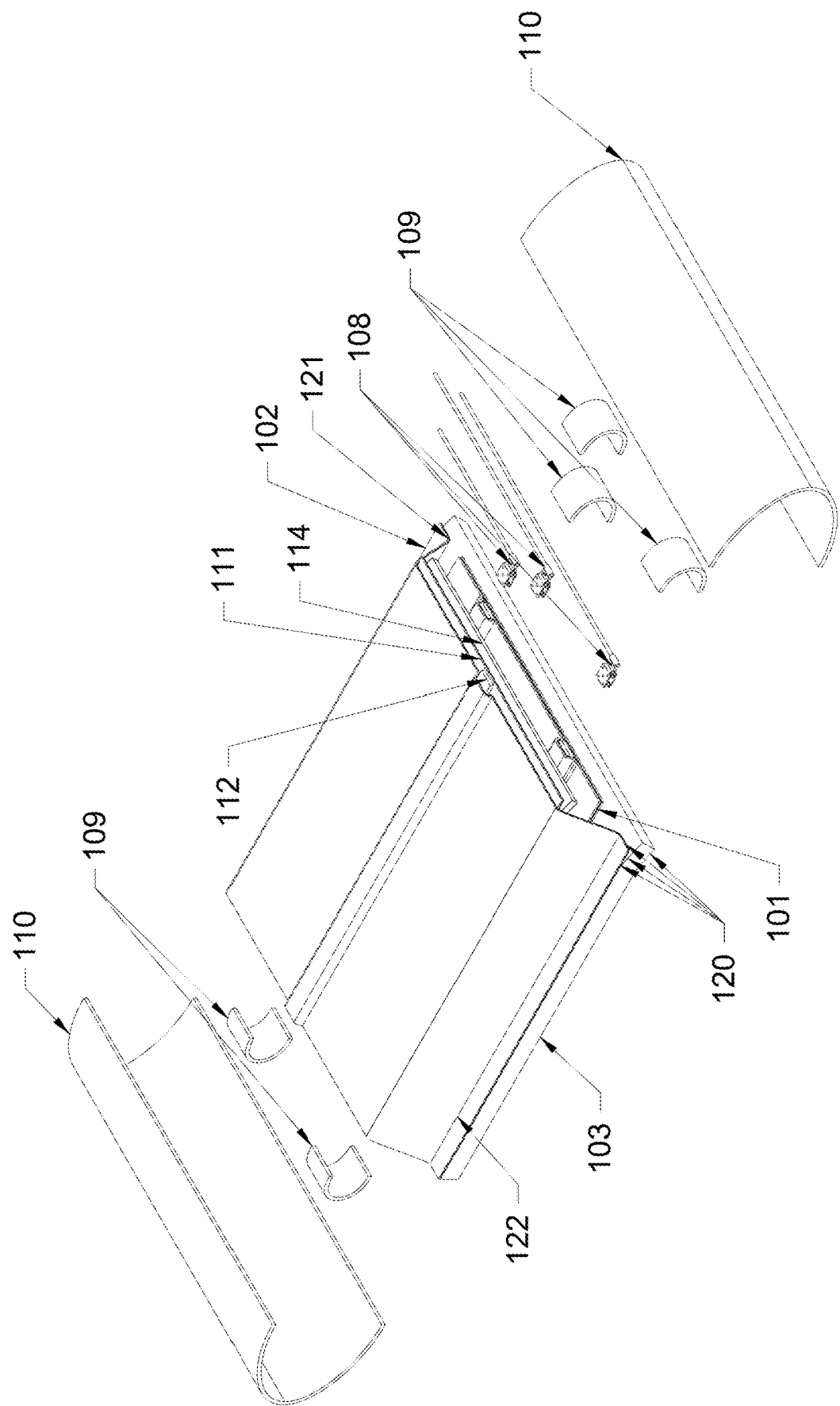
Figure 1F:
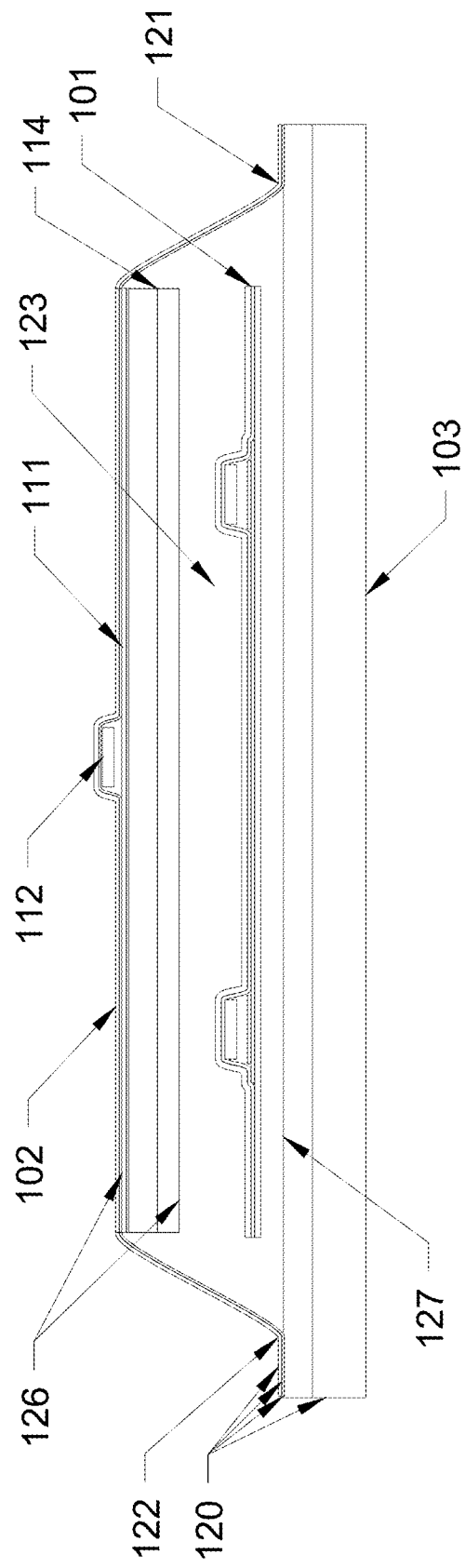

In the example shown in FIGS. 1B, 1D and 1F, the outer shell 120 may also include a central region 123 between the axial side edges 121 and 122. The central region 123 can define the insert receiving space. In an embodiment of the present invention, the central region 123 may not have any bonding or adhesive materials. This may allow the internal cavity to be easily opened to allow the heating element 101, insert 107 and/or other elements to be positioned in the internal cavity.

Alternatively, the axial side edges 121 and 122 and/or central region 123 may include detachable bonding materials, such as a weak adhesive or hook and loop fasteners. This may ensure that the internal cavity of the outer shell 120 remains closed prior to assembly of the heating apparatus 100, while allowing the internal cavity to be opened for positioning of the heating element 101 and/or insert 107. Having a detachable bonding material along the axial side edges 121 and 122 or within the central region or internal cavity 123 may also assist in securing the heating element 101 and/or insert 107 in position within the cavity. It will be understood that the central region or internal cavity may represent space provided in the devices of the present embodiments to receive or secure the heating element 101, insert 107, etc. as well as prevent the heating element 101 and/or insert 107 from being displaced during use.

Preferred embodiments of the heating apparatus 100 may be used for indoor or outdoor applications. The heating apparatus 100 can have a generally planar profile, which may facilitate applications such as floor heating, wall heating, and snow melting/removal. Securing the heating element 101 within the internal cavity, e.g. using a detachable bonding material, may ensure that the heating element 101 is not displaced or flexed when people, animals or vehicles move across the outer surface of the shell 120.

The outer shell 120 can also be made of flexible materials. This may facilitate assembly by allowing the outer shell 120 to be easily opened to insert the heating element 101 and/or insert 107. This may also facilitate using the heating apparatus 100 on non-planar surfaces, such as applications where the apparatus is wrapped around objects or persons such as equipment blankets, clothing or sleeping bags.

The outer shell 120 can also be made of substantially rigid materials. This may facilitate assembly by allowing the outer shell 120 to be constructed with an defined opening to insert the heating element and/or insert 107. This may also facilitate using the heating apparatus 100 on substantially planar surfaces, such as applications where the apparatus is permanently installed on, or part of, a surface such as pavement.

An example embodiment of an outer shell component 200 that may be used as an outer shell 120 is described in further detail below with reference to FIG. 2.

In preferred embodiments, an electric insert 107 may be used having an electric circuit that is electrically connectable to the heating element 101 to a source power and/or control.

The electric insert 107 may also be manufactured of flexible or substantially rigid materials. This may facilitate positioning the insert 107 within the internal cavity of the shell 120 during assembly.

The use of an electric insert 107 may enable an electrical heating apparatus 100 to be customized during assembly for a particular installation. A length of covered heating element 101 may be selected on-site during an installation, and the electric insert 107 and couplings 108 can be easily placed into the cavity 123. This may facilitate installation and provide a planar heating apparatus 100 with a less bulky profile and avoid loose external wires as couplings 108 with a relatively low-profile construction not exceeding the height of the heating apparatus 100. As well, the upper shell 102 and lower shell 103 may protect electronic components of the inserts 107 and electric couplings 108 from environmental conditions such as direct water contact, moisture and humidity. The electric insert 107 may be positioned within the internal cavity 123 with the insert circuitry electrically connected to the heating element.

In various embodiments, as shown in FIGS. 1A and 1B, the insert 107 can be positioned within the internal cavity 123 between the upper layer 102 (or lower layer 103) of the shell 120 and the heating element 101 with insert circuitry electrically connected to the heating element 101.

In preferred embodiments, an isolation layer 113 with thermal and electrical insulation properties may be positioned between the heating element 101 and the insert 107. This may prevent overheating of the insert from the heat generated by the heating element and provide further electrical protection while securing the insert 107 to the heating element 101.

In various embodiments, as shown in FIGS. 1C and 1D, the electric insert 107 may be placed co-planar with the heating element 101 within the internal cavity 123 and between the upper layer 102 (or lower layer 103) of the shell 120 with insert circuitry electrically connected to the heating element 101. The electric insert may have a relatively low-profile construction not exceeding the height of the electrical heating apparatus 100.

In some embodiments, one or more electric inserts 107 may extend in a continuous direction perpendicular to the axial edges of the heating element 101 to provide coupling 108 to other heating elements 101 (and/or, as noted above other apparatuses 100), and external power source and/or controller. For example, in FIGS. 1C and 1D shows an insert 107 providing an electrically continuous power busbar system (e.g. continuously extending perpendicular beyond edges 121 and/or 122) to enable connecting multiple heating elements 101 to each other and/or to other heating apparatuses 100.

In preferred embodiments, the electric insert may be removable from the heating apparatus. This may facilitate repairing or replacing components in the heating apparatus, even after assembly and installation.

The insert 107 can include a plurality of connector end portions and terminal coupling components 108. The coupling components 108 can be used to electrically connect the electric circuit on the insert 107 with the leads of the heating element 101. For example, the coupling components 108 may be provided as foil terminal butt splice connectors, or conductive foils with mechanical fasteners. The coupling components may then be mechanically crimped, riveted, bolted, adhered or otherwise attached to both the insert circuitry and the non-heating conductors, or leads, of the heating element 101 to electrically couple the heating element to the insert circuitry.

In preferred embodiments, after electrically coupling the heating element to insert circuitry, the maximum voltage drop between the non-heating leads of the heating element and the electric circuit is less than 5% of the rated voltage when the full load current of the heating element is applied at the rated temperature.

In preferred embodiments, the coupling components 108 may also include a grounding component. The grounding component can couple the insert 107 to a conductive covering 111 or a grounding strap 112 provided by a grounding layer of the outer shell 120.

The insert circuitry may include power and/or control circuits (not shown). In preferred embodiments, a microcontroller may be included in the insert circuitry to control operation of the heating element 101.

Alternatively, a microcontroller may be omitted. In such embodiments, operation of the heating element 101 may be controlled by an external controller. Alternatively, the heating element 101 may be configured to be always on when connected to a power source. Operation of the heating element 101 may then be controlled by connecting/disconnecting the power source.

The insert 107 can also include one or more junction boxes, cable glands, molded coverings, or external coupling assembly 106. The junction box, cable gland, molded covering, or coupling assembly 106 may be used to couple the heating apparatus 100 to a power source and/or external control circuitry. When the insert 107 is positioned in the cavity of the shell 120, the insert 107 and junction box, cable gland, molded covering, or coupling assembly may extend through the upper layer 102 or lower layer 103 to facilitate a connection to an external power source and/or controller. For example, the upper layer 102 and/or lower layer 103 may include one or more cut-out portions or apertures 105 to provide a connection to other heating apparatuses, an external power source and/or controller. The cut-out portions 105 may be shaped to accommodate the insert 107, junction box, cable gland, molded covering, or coupling assembly 106 on the insert 107.

After the insert 107 is positioned in the internal cavity 123 of the shell 120, the edges of the cut-out portions 105 may be sealed to the insert 107. This may prevent direct water contact, moisture or other environmental debris from contacting the heating element 101 or the circuitry on insert 107.

Preferred embodiments of inserts and couplings 400 that may be used with the heating element 101 as part of an electrical heating apparatus 100 is described in further detail below with reference to FIG. 4.

In preferred embodiments, one or more cut-outs or apertures 105 may extend through the upper layer 102 and lower layer 103 at the axial side edges 121 and/or 122 to provide a means of mounting an external coupling assembly 106 such as a gasket and side entry cable gland for strain relief. For example, an IP67 rated Index Marine SE6 side entry gland and gasket may be used for strain relief of cables (not shown) to an external power source and/or controller may be mounted above an aperture 105, or through an aperture 105. In other examples, the cables (not shown) of a coupling assembly may be secured to the axial side edges 121 and/or 122 through two cut-out holes 105 using a tie-strap passed through and around the cable to provide strain relief, or further provide strain relief. Alternatively, an external coupling may be mounted through cut-out holes 105 using fire retardant nylon bolt with nut.

In the example of FIG. 1, the apparatus 100 may also include sealing components 109/110 comprised of, for example, and not limited to, fusing adhesive tapes or other sacrificial detachable adhesive to allow easier access. The sealing components 109/110 may be used to seal the insert 107, couplings 108, and ends of the heating apparatus 100 after the heating element 101 and insert 107 have been positioned within the shell 120 during manufacture or on-site assembly.

In a preferred embodiment, the sealing components 109/110 may be manufactured of materials that are flame retardant to prevent the spread of a flame. An example thereof is 3M™ Scotch™ 2234 Cable Jacket Repair Tape manufactured of butyl rubber and mastic with self-fusing properties.

In preferred embodiments, such as shown in FIGS. 1A to 1F, where the heating apparatus includes a grounding layer, the shell layers 102/103 and a conductive covering 111 may be extended in the axial direction beyond the edge of the heating element so as to become integrated over or folded around the sealing end portion components 109 of inserts 107 and couplings 108 before sealing the ends of the heating apparatus with sealing component 110. This facilitates electrical shock hazard protection around inserts 107 and couplings 108 using the same conductive covering 111 electrically connected to the ground plane.

In preferred embodiments, where the heating apparatus includes a grounding layer and heating element co-planar with the insert 107 (see for example FIGS. 1C and 1D), a shell layer 102/103 and conductive covering 111 may be integrated over or folded around the sealing end portion components 109 of insert 107 and couplings 108 onto the other shell layer 102/103 and optionally excluding sealing end portion of the apparatus 110.

In preferred embodiments, the sealing end portion 110 may be mechanically secured to the outer shell layer 120, or through the outer shell layer 120, to provide permanent sealing of the apparatus. For example, shell layers 102/103 may be extended axially beyond the edge of the heating element 101 and rivets or grommets may be fastened through shell layers 102/103 and the sealing ends 110.

In preferred embodiments, the ends of the shell 120 may be sealed in the same manner as the axially extending side edges.

Referring now to FIG. 2, shown therein is a cross-sectional view of a shell 200 that includes a plurality of shell layers. Shell 200 is an example of an outer shell that may be used in embodiments of the heating apparatus 100.

In the example shown in FIG. 2, the shell 200 includes a plurality of upper shell layers (201, 203, 209, 212) and a plurality of lower shell layers (202, 204, 209, 213). The upper shell layers and lower shell layers face one another and define an internal cavity 208 (and an attachment region 208') of the shell 200 therebetween.

The shell 200 generally includes a first upper layer (or upper covering layer) 201 and a first lower layer (or lower covering layer) 202. The first upper layer 201 and first lower layer 202 may be protective layers used to shelter the electrical elements in the heating apparatus from the environment. This may protect these electrical elements from damage due to environmental dangers such as direct water contact, moisture, contaminants and electrical leakage currents.

In the shell 200, the first upper layer 201 and first lower layer 202 are insulating layers that define an outer insulating layer of the shell 200. The insulating layers 201/202 can enclose electric heating elements, and other electrical components (e.g. control circuitry), and electrically isolate those components from the external environment. This may protect these electrical components, as well as the surrounding environment, from damage or shock hazards that may occur due to leakage current through the shell.

In preferred embodiments, the insulating layers 201/202 may also have additional protective properties. For example, the insulating layers 201/202 may be manufactured of materials having mechanical and/or chemically resistive properties. Mechanical resistive properties may generally refer to material properties (such as compressibility) that may be reduce the potential damage caused by impacts. Chemical resistive properties may provide resistance to damage caused by basic or acidic materials that come into contact with the outer surface 211 of the shell 200.

In preferred embodiments, the insulating layers 201/202 may provide other physical properties such as higher flame retardance where the heating element does not meet flammability requirements of a particular construction.

In some cases, the insulating layers 201/202 may provide other thermal properties such as high or low thermal conductivity, high or low thermal capacitance, high or low surface emissivity, high or low transparency to thermal radiation. For example, as shown in, for example, FIGS. 2B and 2C, insulating layer 202 may be a flame retardant aerogel blanket layer having 0.025 W/mK thermal conductivity at 50 degrees centigrade laminated to an aluminized radiant barrier film layer having 0.03 surface emissivity.

In preferred embodiments, the insulating layers 201/202 may be manufactured of fluoropolymer materials sufficiently thick (e.g. upwards of 5 mil.) to provide some of the above mentioned properties as an electric cable jacket for a planar heating apparatus. Examples of fluoropolymer jacket materials provided as the insulating layers 201/202 include perfluoroalkoxy (PFA), polytetrafluoroethylene (PTFE) or fluorinated ethylene propylene (FEP).

In preferred embodiments, the upper shell 201 may consist of a second functional layer 212 that may be detachably attached to an upper shell 201. For example, a high-traction surface tread such as 3M™ Safety-Walk™ 600 Series tape may be provided to mitigate slip-and-fall incidents where the electrical heating apparatus 100 is used over pavement surfaces to melt snow and de-ice. This layer may be removed or replaced to repair the layer after wear. In other examples, an anti-fracture membrane may be provided to allow for embedding within thin-set mortar or concrete.

In preferred embodiments, the lower layer 202 may be consist of a second functional layer 213 that may be detachably attached to a lower shell 202. For example, the second functional layer 213 may be a flame retardant thermal insulation layer. In other examples, a flame retardant EPDM or vulcanized silicone rubber may be used to further protect the electrical heating apparatus 100 from penetration of objects on the installation surface, and provide additional weight that prevents movement when installed over pavement surfaces to melt snow and de-ice.

In preferred embodiments, the insulating layers 201/202 or secondary functional layers 212/213 may provide electric functionality, such as temperature sensing, force sensing, lighting, power generation, or electrical storage. For example, an printed photovoltaic circuit 212 may be laminated onto the upper shell layer 201 and a planar rechargeable battery 213 may be secured to the lower shell layer 202 to provide a heating apparatus that is energy sustainable. In other examples, a printed electroluminescent circuit may be laminated to a piezoelectric generator together as a functional layer 212 that may be laminated to the upper shell layer 202 to provide a heating apparatus that stores kinetic energy from pedestrian traffic for floor lighting.

In preferred embodiments, the upper layer 201 and lower layer 202 may be manufactured of different materials and/or may have different thickness. The first upper layer 201 may be manufactured to provide greater heat transfer than the first lower layer 202. For example, the second upper layer 212 may be manufactured of a 35 mil thick section of 3M™ Safety Walk™ 600 series while the second lower layers 213 can be manufactured of a 125 mil thick EPDM rubber.

Additionally or alternatively, the upper layers 201/212 may be manufactured of materials that provide additional resistance to impact damage where the upper layers 201/212 are exposed while the lower layers 202/213 rest on a surface such as a driveway.

The outer peripheral regions of the first upper layer 201 and first lower layer 202 may be joined together to define a perimeter of the shell 200. For example, in the case of a rectangular shell 200, the axial side regions of the first upper layer 201 and first lower layer 202 can be joined together. In general, the bond between the first upper layer 201 and first lower layer 202 may permanently secure the perimeter of the first upper layer 201 and first lower layer 202 to form the outer layer of the shell 200. The bond between the perimeter of the first upper layer 201 and first lower layer 202 may be a watertight (or substantially waterproof) seal, to prevent water from seeping into the internal cavity 208 and potentially damaging the electrical components enclosed therein.

Figure 2A:
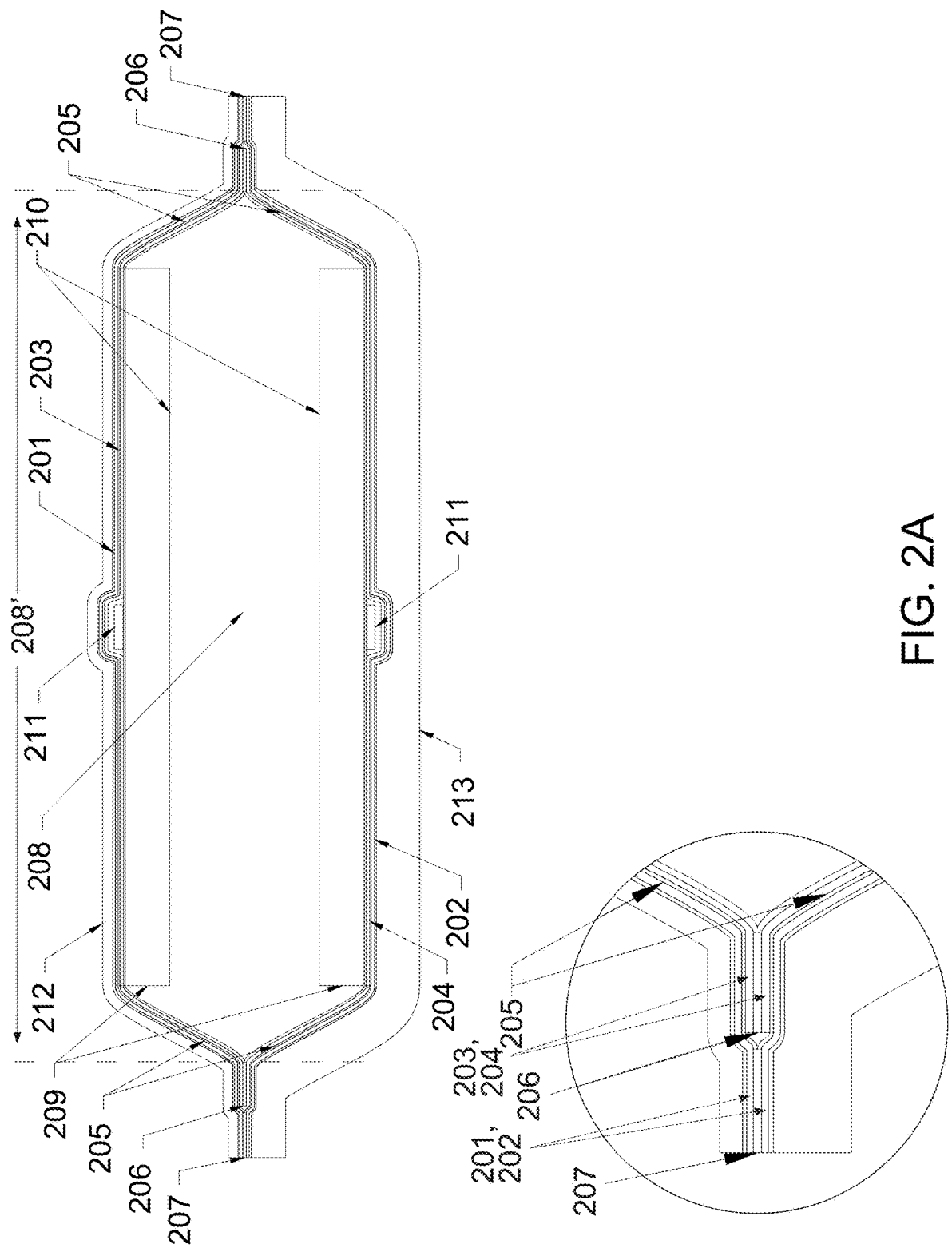
FIGS. 2A, 2B, and 2C are diagrams illustrating cross-sectional side views of outer shell layers that may be used with the electrical heating apparatuses of FIG. 1, in accordance with example embodiments.
Figure 2B:
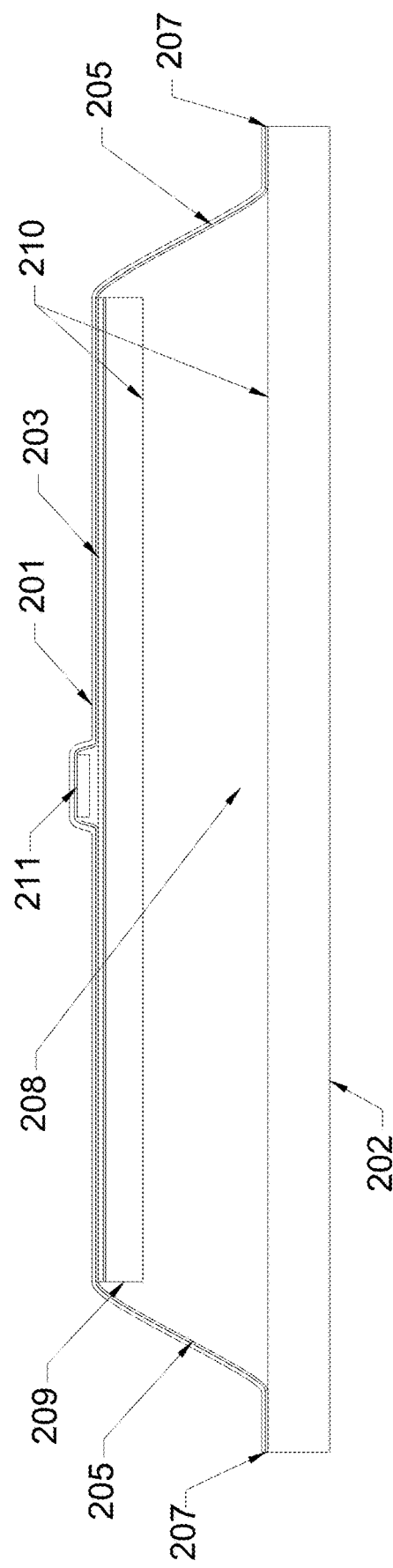

As shown in FIGS. 2A and 2B, the first upper layer 201 and first lower layer 202 can be adhered to one another by an adhesive layer 207. For example, a 3M™ Double Coated Tape with 3M™ Silicone Adhesive or 3M™ VHB™ Tapes may be used as the adhesive layer 207.

Figure 2C:
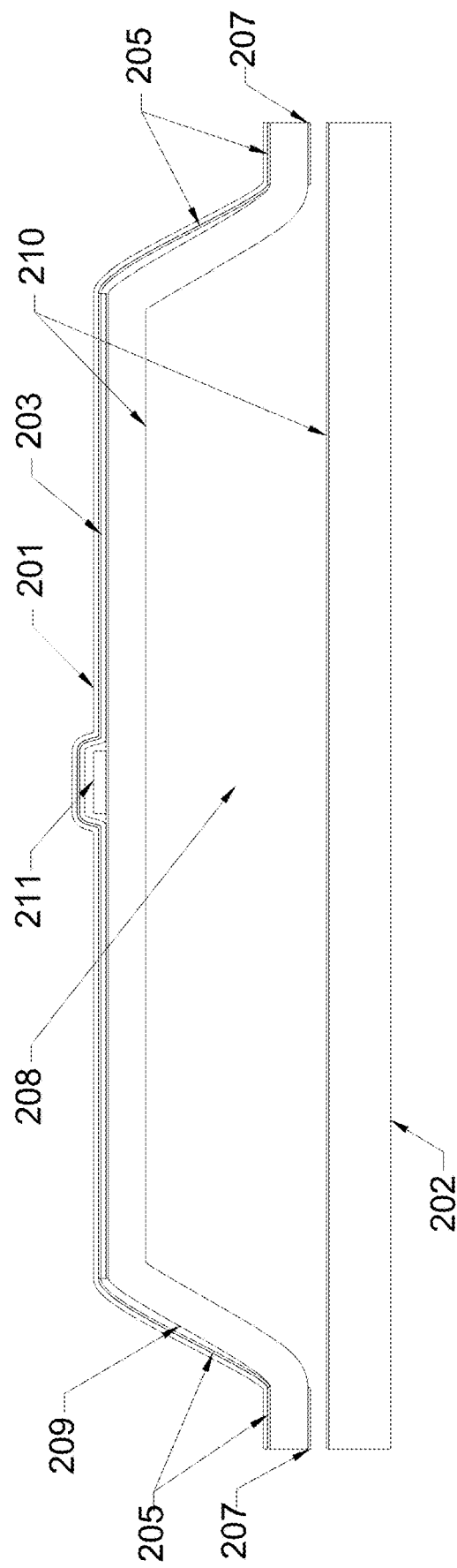

As shown in FIG. 2C the second upper layer 209 and first lower layer 202 can be adhered to one another by an adhesive layer 207. For example, a 3M™ Double Coated Tape with 3M™ Silicone Adhesive or 3M™ VHB™ Tapes may be used as the adhesive layer 207.

As shown in FIG. 2A, the shell 200 can also include a grounding layer formed by upper conductive covering layer 203 and lower conductive layer 204. The conductive covering layers 203/204 may operate as a ground plane used to couple the heating element to ground. The conductive covering layers 203/204 may be connected to ground for residual-current detection using a ground fault current interrupter (GFCI) or ground fault equipment protector (GFEP) device.

As shown in FIGS. 2B and 2C, the shell 200 can also include a single conductive covering layer 203 for protection from electrical shock hazards on the side of heating apparatus 100 most likely to experience physical damage.

In general, the conductive layers 203/204 may be conductive substantially throughout their entire surface area to ensure that the heating element can be grounded at any location. For example, the conductive layers 203/204 may provide electrical continuity to within about 0.1-0.5 Ohms across the longest length of the conductive layers 203/204. In some examples, the conductive covering 203/204 may provide a DC resistance per unit length equal to or less than that of the lowest resistance heating conductor per unit length.

The conductive covering 203/204 may carry a minimum current per cross sectional area (e.g. of foil or wire) at least equal or less than the current carrying capacity of the non-heating conductors of the heating element per cross sectional area at the temperature rating of the heating apparatus.

Figure 2D:
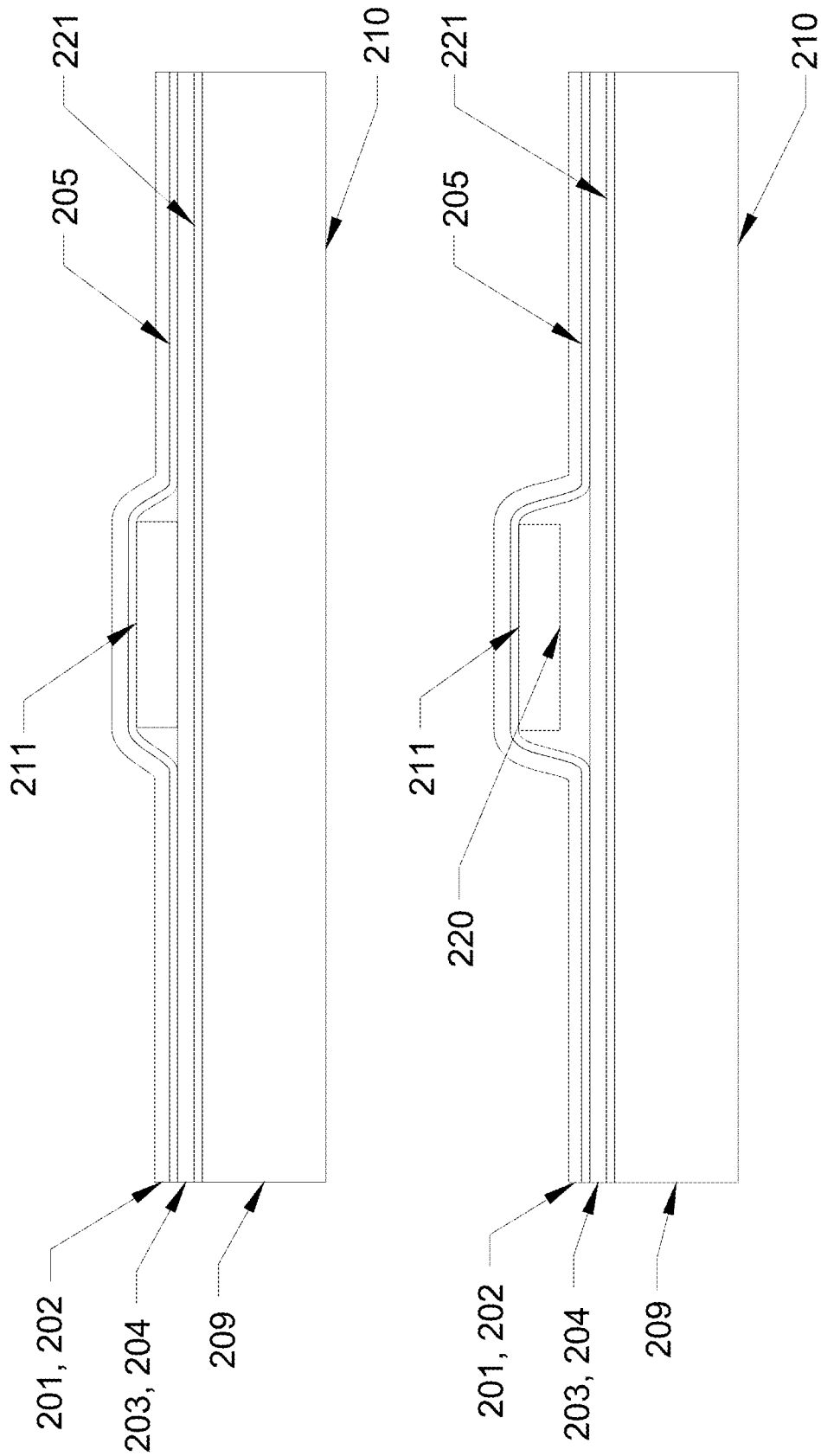
FIGS. 2D and 2E are diagrams illustrating cross-sectional side views of an outer shell layer including a shell layer, conductive covering layer, grounding strap and a dielectric layer that may be used as an outer shell layer of FIGS. 2A, 2B and 2C, in accordance with example embodiments.
Figure 2E:
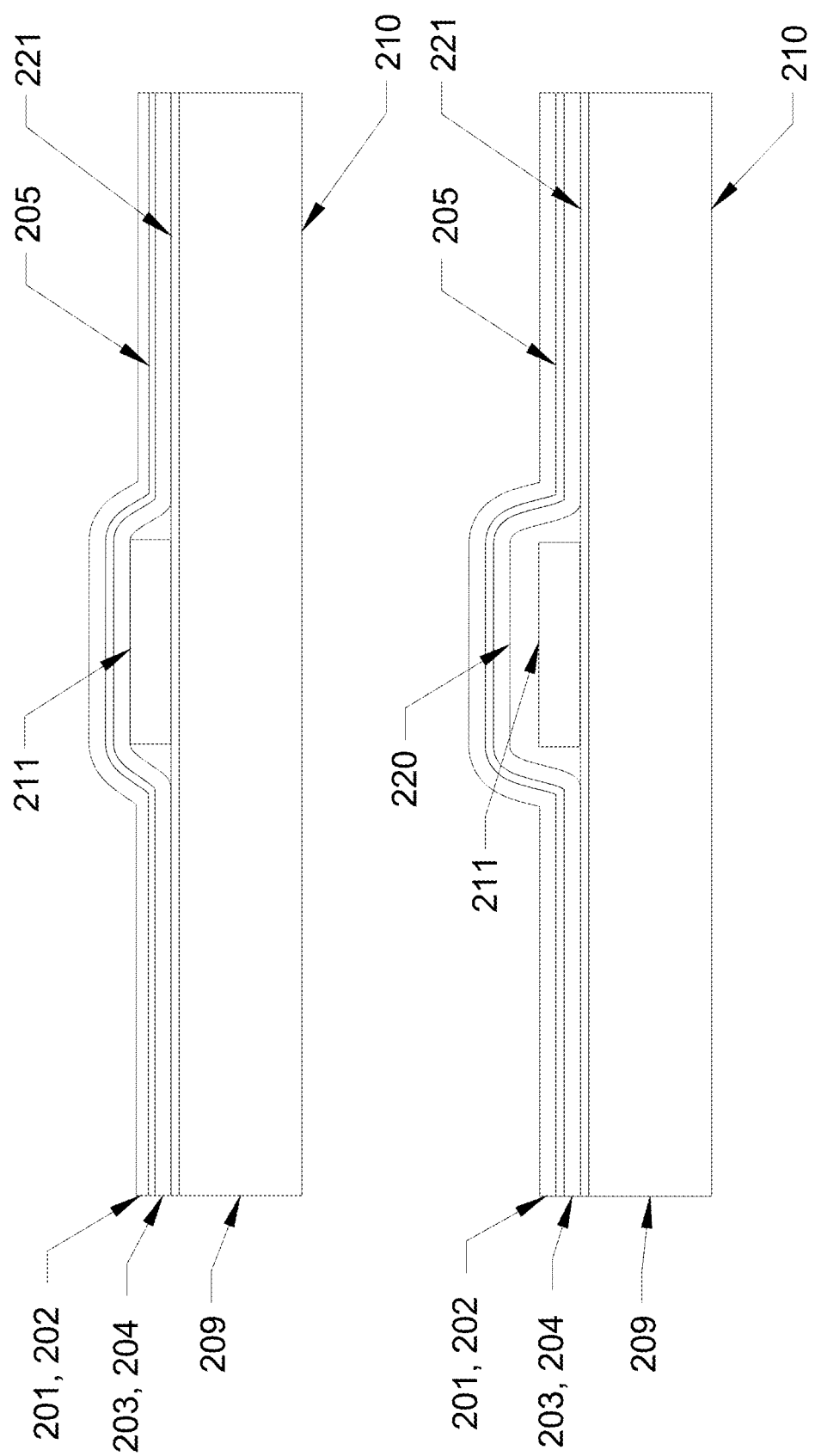
Figure 2F:
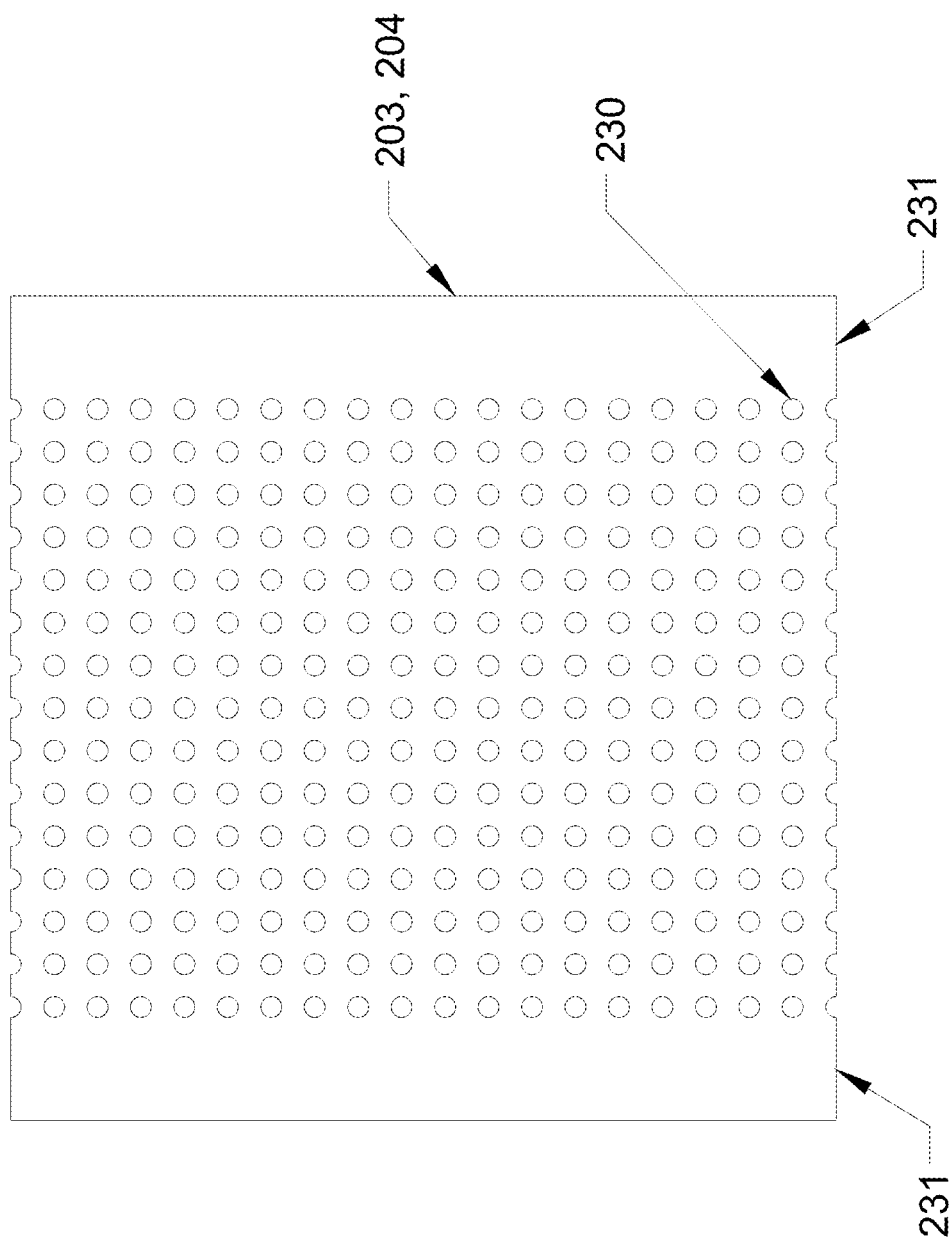
FIGS. 2F and 2G are diagrams illustrating plan views of the conductive covering layers that may be used with the outer shell layers of FIGS. 2D and 2E, in accordance with example embodiments.
Figure 2G:
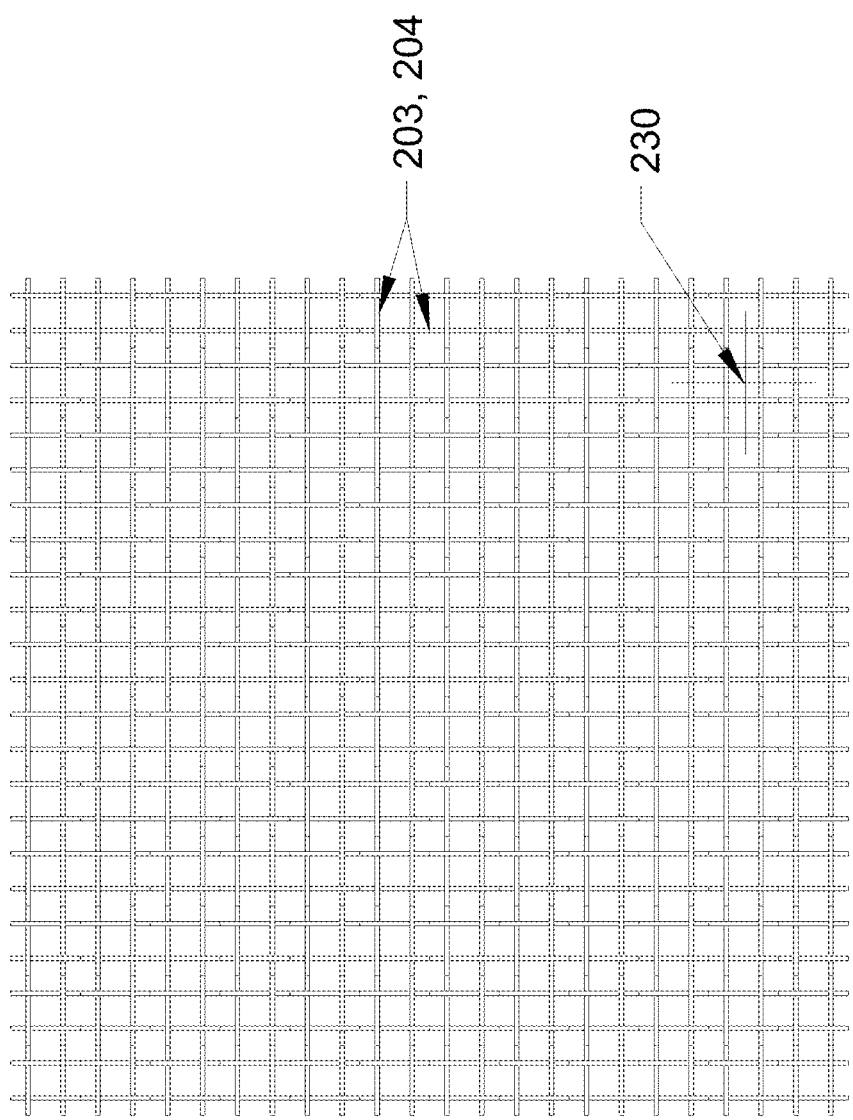

In preferred embodiments, the conductive layers 203/204 may be manufactured using various electrically conductive materials such as inks, foils, wire braids, meshes, and coatings that cover substantially the entire planar area of the heating element or a defined pattern with open area as illustrated in FIGS. 2F and 2G. As with the protective layers 201/202, in preferred embodiments the upper conductive layer 203 may provide greater heat transfer than the lower conductive layer 204. For example, the upper conductive layer 203 may be manufactured using a thinner section of aluminum foil as compared to the lower conductive layer 204.

As shown in FIGS. 2F and 2G, providing a conductive layers 203/204 with a defined pattern having a maximum 30% open area over the heating element may reduce capacitive reactance and leakage conductance between the conductive layers 203/204 and the heating element.

In preferred embodiments, providing a conductive layers 203/204 with a defined pattern having a maximum 30% open area over the heating element may also increase transparency to thermal radiation and reduce the effect of EMI shielding. This may be especially useful in room heating applications, where maximum thermal radiation is desirable and EMI shielding is generally undesirable.

In some embodiments, a defined pattern of a conductive layer 203/204 may provide a maximum circular hole diameter or square hole dimension 230 up to 1 mm (39 mil.) in the central region of the heating element. This may facilitate a ground fault condition when sharp objects wider than 1 mm penetrate through the conductive covering layer 203/204 and into the heating element.

In preferred embodiments, the defined pattern may not extend beyond the regions containing the non-heating conductors 231 which may provide protection from objects penetrating through the conductive covering layer 203/204 and into the low-resistance non-heating conductors of the heating element.

In preferred embodiments, the conductive layers 203/204 may be manufactured of low or high emissivity materials providing thermal radiation outwards toward a preferred upper layer 201 or lower shell layer 202. For example, an aluminum 1000 series alloy foil may be chosen with a mill finish instead of a polished finish to improve emissivity of the shell layer 200. In other embodiments, a surface texture between 8-14 microns is desirable to improve the emissivity of far infrared radiation (IR).

The conductive layer 203 and 204 may also be attached to one another to form a continuous inner shell layer, as shown in FIG. 2A. The periphery (e.g. the side edges) of the conductive layers 203 and 204 may be attached using a conductive coupling to provide a continuous conductive layer. For example, a conductive adhesive 206 (e.g. 3M™ Conductive Adhesive Transfer Tape or 3M™ Conductive Aluminum Foil Tape) may be used to attach the conductive layers 203 and 204 to one another.

The conductive layer 203/204 can be secured to the upper and lower protective layers 201 and 202 respectively. In general, the conductive layers 203/204 may be fixed to the upper and lower protective layers 201 and 202 to prevent relative movement therebetween after manufacturing. For example, the conductive layers 203/204 may be adhered to the upper and lower protective layers 201 and 202, using an adhesive layer 205 that extends substantially across the outer surface of the conductive layers 203/204.

As part of an outer shell layer construction for grounding, shown in FIGS. 2D and 2E, the inner surface of the conductive covering layer 203/204 may also be permanently or detachably attached to a dielectric layer 209 having an attachment region 221. The dielectric layer 209 may electrically insulate the heating element 101 from the conductive covering layer 203/204 to further reduce capacitive reactance and ground leakage conductance to conductive covering layer 203/204.

In embodiments of the present invention, the dielectric layer materials may be manufactured of materials with substantially low dielectric constant (e.g. 1.20-2.15) over the operating frequency of the heating apparatus 100 to mitigate leakage conductance over greater surface areas or with longer lengths.

In preferred embodiments, the dielectric layer 209 may be manufactured of fluoropolymer materials sufficiently thick (e.g. up to 62.5 mil) to provide some of the above mentioned properties as an electric cable dielectric for a planar heating apparatus. For example, fluoropolymer materials provided as the dielectric layer 209 include nanoporous or microporous polytetrafluoroethylene (PTFE) or expanded PTFE (ePFTE) such as Porex® substrate films, 3M™ Dyneon™ membranes, Saint Gobain ZITEX® G membranes, or closed-cell foams fabricated with Teflon™ FFR.

In preferred embodiments, the insulating layer 201/202 and dielectric layer 209 may provide dimensional stability where penetration of a conductive object may occur through the shell 200, into the conductive covering 203/204 and dielectric layer 209. In preferred embodiments, dimensional stability may ensure the conductive covering does not shear in order to provide electrical continuity between a conductive object and the ground sheath. For example, dimensional stability in the shell layer 200 provides a reliable connection to the conductive covering where insulation piercing connectors are used to connect to the conductive covering 203/204 through the shell layer 201/202 such as Tyco TERMI-FOIL or CommScope Undercarpet Cabling Splice and Tap Clips.

In preferred embodiments, the outer shell construction including the insulating layers 201/202, conductive coverings 203/204, and dielectric layers 209, may provide protection of a planar heating apparatus from further catching fire in the event of an electrical short or ground fault. For example, the outer shell construction with grounding may provide higher flame resistance than the heater element to prevent the spread of flames and ignited material drippings resulting from internal combustion of the heating element or external exposure of the heating apparatus to a flame.

In preferred embodiments, the shell layer 200 may be water permeable including the insulating layers 201/202, conductive coverings 203/204, and dielectric 209 layers. For example, the heating element may be perforated where installing within soil or under concrete such that water may permeate through the shell 200.

In preferred embodiments, the outer surface of a conductive covering layer 203/204 may be in direct contact with a grounding strap 211 for a preferred direction of connection of grounding strap 211 exterior to the apparatus. In other embodiments, the inner surface of a conductive covering layer 203/204 may be in direct contact with grounding strap 211 for a preferred direction of connection of grounding strap 211 interior to the apparatus.

A grounding strap 211 may be electrically continuous with the conductive covering layer 203/204 and extend along the axial length. The grounding strap 211 may provide a low-resistance path for electrical leakage currents to travel from any point on the surface of the conductive covering layer 203/204 to ground or earth potential.

In preferred embodiments, the maximum voltage drop between conductive covering 203/204 and grounding strap 211 may be less than 5% of the rated voltage when the full load current of the heating element is applied at the rated temperature.

In embodiments using conductive layers 203/204, the conductive layers 203/204 or any dielectric layers 209 may define an inner or interior surface 210 of the shell 200. In general, the inner surface 210 of the shell 200 may refer to the surface of the shell 200 facing the internal cavity 208 into which additional components, such as a heating element and/or electric insert and/or couplings may be received. For example, the dielectric layers 209 may define an upper inner surface 210 while the lower shell layer 202 may define a lower inner surface 210 forming a pocket within which a portion of the electrical insert may be received and electrically coupled to the heating element, grounding strap or conductive layer, and electric insert. In preferred embodiments, the conductive layers 203/204 may also be substantially rigid to enable the conductive layers 203/204 to be temporarily or permanently removed from the outer shell layers, e.g. by peeling.

The interior surface 210 of the shell 200 may include an inner bond region. The inner bond region may include one or more detachable bonding elements. The inner bond region may prevent slippage (and resulting deformation) between the shell 200 and elements positioned in the cavity 208. For example, a weak adhesive layer (e.g. 3M™ Pressure Sensitive Adhesive Tapes or 3M™ Adhesive Transfer Tapes) may be applied to the upper and/or lower side of the interior surface 210. The inner bond region may correspond to the receiving portion of the perimeter of the shell 200.

The inner bond region can be detachable to enable the shell 200 to be separated to provide access to the internal cavity 208. This can allow heating elements to be inserted and/or substituted as need. As well, any thermal insulation layers and/or circuit components may also be access by opening the shell 200. Alternatively, the inner bond region may be omitted. This may facilitate the insertion, removal and/or replacement of components within the cavity 208.

In preferred embodiments, the shell 200 may include more or fewer shell layers. For example, the conductive grounding layers 203 and 204 may be omitted in preferred embodiments.

In preferred embodiments, an additional thermal layer 209 may be included in the shell 200, which may function as the dielectric layer. In preferred embodiments, the thermal layer 209 may be positioned between the lower protective layer 202 and the cavity 208 (i.e. where the heating element is to be positioned). Alternatively, the thermal layer 209 may be positioned between the upper protective layer 201 and the cavity 208. The positioning of the thermal layer 209 can be selected based on the desired direction of heating for the heating apparatus 100. The thermal layer 209 may be included as a component of the shell 200, or alternatively may be inserted into the cavity 208 above or below the heating element.

The thermal layer 209 may provide thermal insulation to prevent or at least deter heat from a heating element positioned in the cavity 208 from leaking through the lower protective layer 202 or upper protective layer 201. This may ensure that a greater portion of the heat from a heating element in the cavity 208 is directed towards the surface to be heated. For example, where the upper layer is positioned for snow melt applications, the thermal layer 209 may be positioned between the lower protective layer 202 and the cavity 208 to ensure that more heat is transferred towards the driveway surface on which snow sits rather than downward towards the ground underneath the apparatus 100.

The thermal layer 209 material may be manufactured from various thermal insulation materials, such as foams, ceramic fibers, or aerogels. In general, the thermal layer 209 material can have a low thermal conductivity and low specific heat capacity. The thermal layer 209 material may also be flame retardant. For example, a 5 mil polyamide-aerogel composite film with a thermal conductivity of 0.03 W/mK at room temperature may be used as thermal insulation.

When positioned in the shell 200, the thermal layer 209 can be detachably attached to the interior surface 210. The thermal layer 209 may also be detachably attached to a heating element positioned in the cavity 208. For example, the thermal layer 209 may be attached using a weak adhesive layer such as 3M™ Pressure Sensitive Adhesive Tapes or 3M™ Adhesive Transfer Tapes. This may allow the thermal layer 209 to be removed and/or replaced as desired, while also preventing relative slippage and resulting deformation between the thermal layer 209 and other components of the shell 200.

Alternatively, the thermal insulation layer 209 may be manufactured as a laminate layer along with the other layers of the shell 200.

Referring now to FIG. 3, shown therein is a cross-sectional view of a heating element 300. Heating element 300 is an example of a heating element that may be used in embodiments of the heating apparatus 100 shown in FIG. 1, for example.

The heating element 300 can be substantially planar. The heating element 300 may also be manufactured of flexible materials to facilitate insertion into the shell 120. For example, the heating element 300 may be manufactured as a thick-film printed electronic heating element. The heating element 300 may also be manufactured using various flexible planar materials such as conductive films, laminates and non-woven or woven fabrics. Alternatively, the heating element 300 may be a rigid heating element.

In general, the heating element 300 can include one or more resistive or inductive heating conductors 302. For example, a plurality of resistive heating conductors 302 may be arranged into an array (e.g. an array of parallel heating elements) in the heating element 300. The particular arrangement of resistive heating conductors 302 may be selected based on the desired heating pattern (for example see FIGS. 3G, 3H and 3J). The heating conductors 302 may be operable using AC or DC power depending on the particular embodiment.

In preferred embodiments, the heating conductor 302 may be an electric ink, coating, elastomeric, concrete or woven/non-woven fabric covering substantially the entire planar area or in a defined pattern to provide the heating conductors 302 of the heating element 300.

The heating element 300 may include at least two primary non-heating conductors 301 as electric leads (e.g. copper foil strips). The primary non-heating conductors 301 provide terminals for the heating conductors that may be connectable to a power source via power and/or control circuitry. In an embodiment of the present invention, the non-heating conductors 301 may span the length of the heating element 300. This may allow the heating element 300 to be cut to a desired length for installation. For example, two parallel copper foil strips may be used as the lead elements 301 along the length of the heating element 301 at a clearance distance from both edges depending on the requirements.

In an embodiment of the present invention, the heating element 300 may include secondary non-heating conductors 305 in direct contact with the primary non-heating conductors 301 and heating conductors 302. This may facilitate a reduced voltage drop from the high resistance of the non-heating conductors 302 to the lower resistance of the heating conductors 301 to prevent overheating and electrical shorts at the interface between them. For example, a silver ink may be used with lower resistance per square in comparison to the heating conductors and higher resistance in comparison to the primary non-heating conductors.

In an embodiment of the present invention, the secondary non-heating conductors 305 may extend along the length of the heating element 300 in direct contact with the heating conductors 302 and primary non-heating conductors 301.

In an embodiment of the present invention, the secondary non-heating conductors 305 may be arranged in an interlaced comb spanning the length forming a discretized pattern of short length low-resistance heating elements connected electrically in parallel.

The resistive heating conductors 302 can be arranged to be electrically parallel along the length of the heating element 300. This may allow the heating element 300 to be cut to a desired length without requiring designated cutting locations or a visual inspection to ensure that the resistive or inductive elements remain electrically connected to the leads 301.

The resistive heating conductors 302 may be arranged with a circuit topology that permits the heating element 300 to be cut and/or separate parts of the heating element into a desired shape. Various examples of circuit topologies are shown in FIGS. 3G, 3H and 3J. For example, the heating element 300 may be arranged with multiple parallel resistive heating conductors to non-heating conductor bus bars spanning the length, with perpendicular non-heating conductor booth bars connected across in an interlaced comb spanning the length forming a discretized pattern of short length low-resistance heating elements connected electrically in parallel. This may facilitate a surface power or heat flux density, or plurality of densities, of the heating element 300.

In an embodiment of the present invention, as shown in FIG. 3G, a plurality of heating elements 101 of a plurality of apparatuses 100 or within a single apparatus may be connected electrically in series or parallel so as to represent a single heating element or apparatus with a plurality of leads that are connectable to power and/or control circuits. Where the heating elements 101 or apparatus 100 are adjacent to each other, this may facilitate larger or wider apparatuses. Effectively, individual heating elements or apparatuses can operate as a single appliance over a larger area. It will be understood that there may be multiple heating elements within an apparatus as well as multiple apparatuses within a particular installation.

In an embodiment of the present invention, a plurality of heating elements 101 may be stacked vertically (such as, for example, laminated) to facilitate operation of the heating apparatus 100 at different power or heat flux densities without changing AC or DC voltage. For example, in under floor heating installation, such a layered heating element may be operated at 15 Watts per square foot in higher load applications and 7.5 Watts per square foot in lower load operation.

In an embodiment of the present invention, a thermal layer with insulating properties may be placed between two heating elements 101 to facilitate bi-directional heating functionality.

FIG. 3G shows an example of a heating element having low surface power density with no interlaced comb.

FIG. 3H shows an example of a heating element with higher surface power density with an interlaced comb topology of non-heating conductors. FIG. 3J shows another example of a heating element with higher surface power density with an interlaced comb topology. The interlaced comb topology shown in FIGS. 3H and 3J may facilitate cutting and/or separating parts of the heating element into a desired shape while still ensuring that the primary non-heating conductors 301 retain electrical continuity.

In preferred embodiments, the heating element 300 can be manufactured of materials that exhibit self-regulating properties such that the electric resistance is variable with temperature. The heating conductors 302 of the heating element 300 may be self-regulating such that the electric resistance is variable with temperature. For example, a resistive heating conductor may be manufactured of Positive Temperature Coefficient (PTC) materials formulated using carbon pastes such as Dupont 7292 or Henkel LOCTITE® ECI 8001. This may further improve efficiency by avoiding or reducing switching latencies.

In preferred embodiments, the PTC materials may be dual-phase to provide a primary phase for operation and a secondary phase for protection as an electric fuse. For example, the PTC material formulated may provide operation up to a switching temperature at 32 degrees centigrade, and a maximum temperature at 50 degrees centigrade after which the heating conductor 302 made of PTC material becomes a sacrificial electric fuse.

The switching temperature of the resistive heating conductors used may vary depending on the application of the heating apparatus 100. For example, in snowmelt or de-icing applications, a conductive polymer ink with PTC properties and switching temperature of 10 degrees centigrade may be used for the resistive heating conductors 302. The switching temperature may be selected to be low so as to prevent heat or fire damage due to overheating at higher temperatures. As well, the surface power density may be decreased around the selected switching temperature to improve efficiency of the heating element 300.

In preferred embodiments, the heating conductors 302 of the heating element 300 may be a fixed resistance with temperature and regulated by controller using a thermal sensor such as a thermistor, thermocouple, or resistance temperature device (RTD). In an embodiment of the present invention, fixed resistance heating conductors 302 of the heating element 300 may be provided for electric resistance heating circuits.

As shown in FIG. 3, the heating element 300 can also include insulating layers 303 and 304. The insulating layers 303/304 may electrically insulate the resistive heating conductors 302 from other components of the heating apparatus 100. The insulating layers 303/304 may be manufactured of materials selected to have a thickness and dielectric strength sufficient enough to overcome the voltage breakdown (kV) specified for a particular implementation. For example, a layer of polyethylene terephthalate (PET) or polyamide (PA) may be used for the upper and lower insulating layers 303/304 with thickness and dielectric strength selected to meet a voltage breakdown rating of 2.5 kV.

In an embodiment of the present invention, the insulating layers 303/304 may be manufactured of fluoropolymer materials selected to have a thickness and lower dielectric constant sufficient to reduce the capacitive reactance and leakage conductance through to the outer surface of the insulating layers 303/304. For example, a layer of fluoropolymer material such as fluorinated ethylene propylene (FEP) film may provide a dielectric constant between 1.9 and 2.15 at the desired operating frequencies sufficient to achieve lower capacitive reactance and leakage conductance to a conductive covering as part of the shell layer.

In preferred embodiments, the insulating layers 303/304 may have a higher flame retardance than the heating conductors 302 and may be deemed halogen-free per environmental, health and safety standards. For example, Dupont Teijin Melinex® FR220 or Saint Gobain ChemFilm® FEP-FG.

In preferred embodiments, the insulating layers 304/305 may also provide other properties and functionalities, such as high or low thermal conductivity and high or low transparency to thermal radiation. In preferred embodiments, the insulating layers 304/305 may also provide on the surface functional electric elements for temperature sensing, force sensing, or even power storage.

The components of the heating element 300 may be secured to one another, e.g. using adhesive or hot-melt lamination. The attachment region 320, may be manufactured of adhesive materials having similar flame retardance properties to the insulating layers 303/304. However, at least one of the insulating layers 303/304 may not be secured to the leads 301. Accordingly, a connection pocket 321 may be provided above (or below) each of the non-heating conductors 301. This can allow the leads to be electrically coupled to external circuitry in a preferred direction toward the central region of the shell, and ultimately to a power source.

Figure 4A:
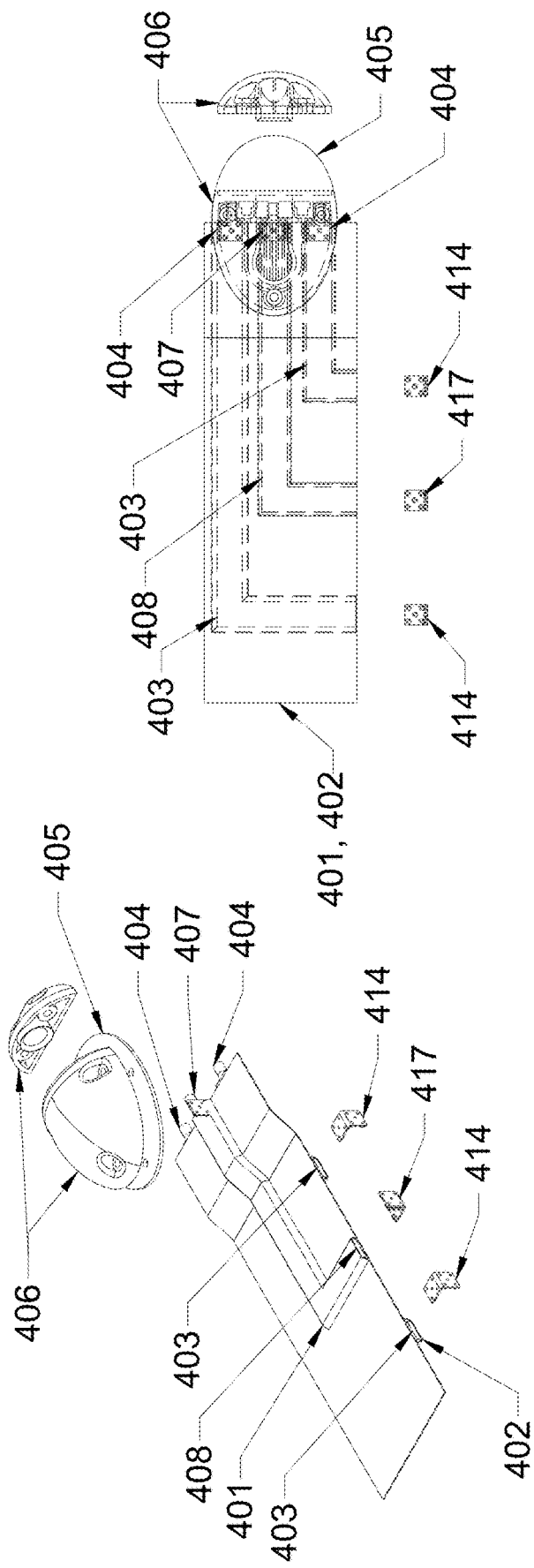
FIGS. 4A, 4B and 4C are diagrams illustrating exploded perspective views and plan views of an electric insert component for coupling to a power source that may be used with the electrical heating apparatuses of FIG. 1 in accordance with example embodiments.
Figure 4B:
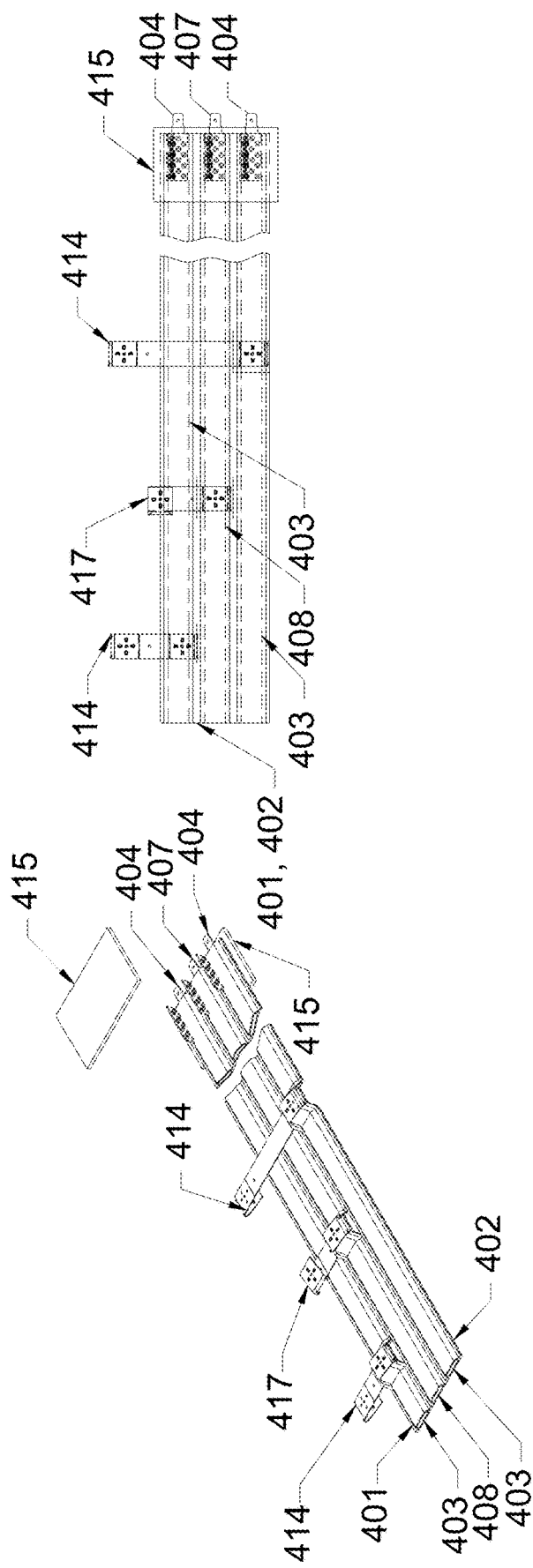
Figure 4C:
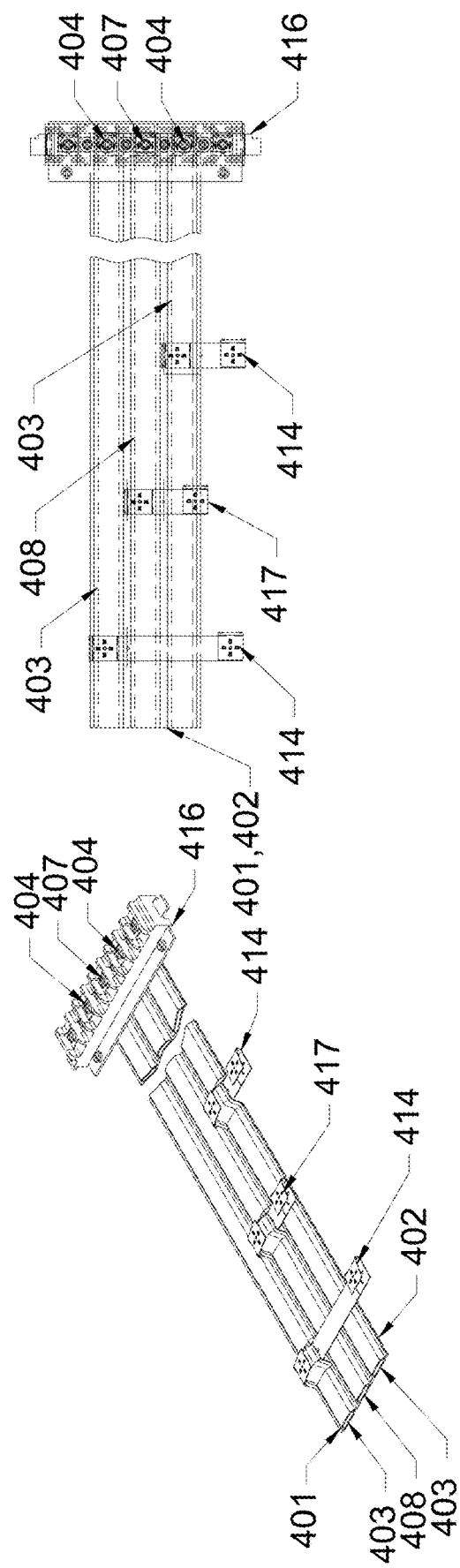
Figure 4D:
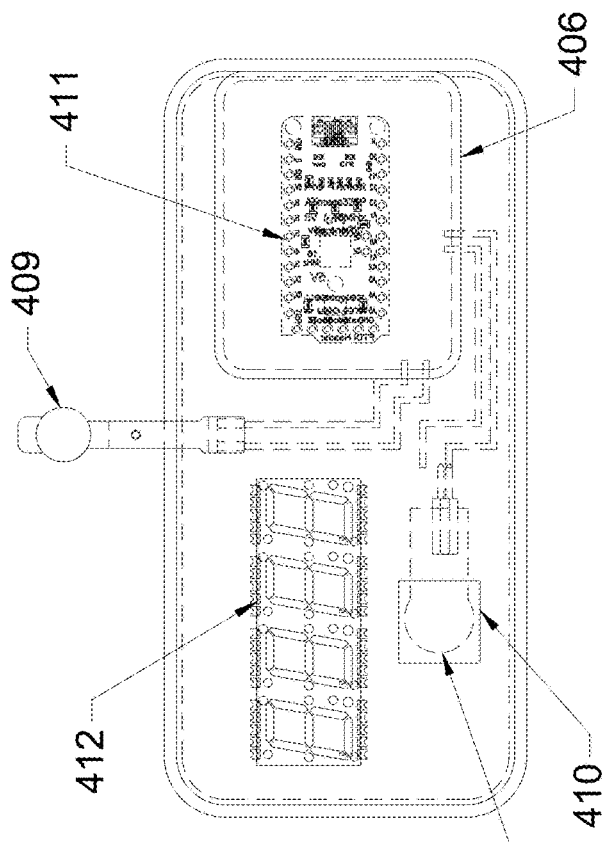
FIGS. 4D and 4E are diagrams illustrating exploded perspective views and plan views of an electric insert component including sensors and control circuitry that may be used with the electrical heating apparatuses of FIG. 1 in accordance with example embodiments.
Figure 4D:
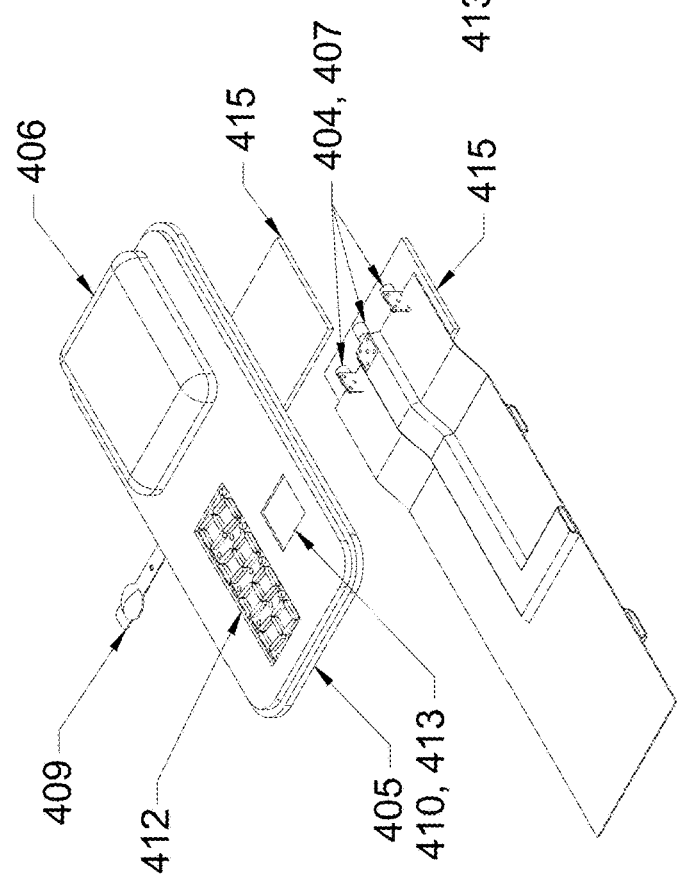
Figure 4E:
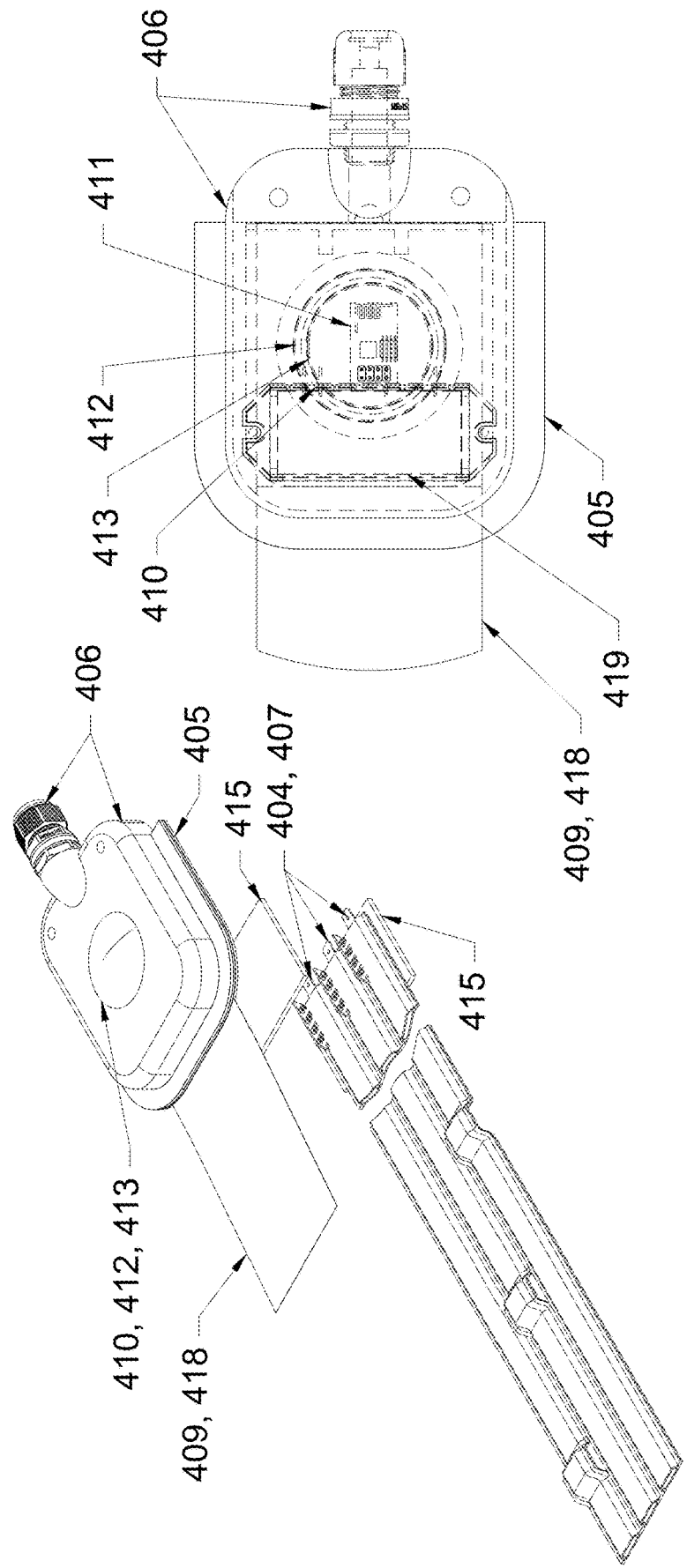

Referring now to FIGS. 4A to 4E, shown therein are examples of insert components that may be used in embodiments of the heating apparatus 100 described herein. FIGS. 4A to 4C show an exploded perspective and top view of insert components having power coupling components 404/407 with power coupling assembly 406/416 and omitting a controller. FIGS. 4D and 4E shows an exploded perspective view and top view of insert components that include a control circuitry and a controller 411.

The inserts shown in FIG. 4 include substrate layers 401 and 402. One or both of the substrate layers 401 and 402 having insert electrical circuitry thereon or therewithin. The substrate layers 401 and 402 may be manufactured of flexible or rigid materials. For example, the insert electrical circuitry (e.g. foils) can be converted/laminated with or printed on the substrate layers 401 and/or 402 using inks. In other examples, the insert electrical circuitry can be assembled using copper bus bars insulated with substrate layer 401/402 and assembled rigidly but also disassemblable.

The circuitry shown in FIGS. 4D and 4E includes both power and control circuit components. In preferred embodiments, the control circuitry may be omitted from the insert (as shown in FIGS. 4A to 4C) and an external controller (or no controller) may be used to manage the operation of the heating apparatus 100.

The insert electrical circuitry includes non-heating conductors, or electrical terminal components 403/408. The non-heating conductors 403 are configured to be electrically coupled to the non-heating conductors 301 of a heating element and non-heating conductors 408 to a grounding strap 112 or conductive covering 111 in apparatus 100. The non-heating conductors 403/408 are coupled to a power supply connector 404/407, e.g. crimping foil terminal connectors to bare copper foil ribbons or strips placed on the substrates 401 and/or 402 as a bus. The power supply connector 404/407 can be used to connect the heating element 300 to a source of power.

In preferred embodiments, a flat conductor cable may provide the function of insert electrical circuitry having laminated Mylar® substrates 401/402 enclosing a plurality of non-heating copper ribbon conductors 403/408 perforated at insulated regions between them. For example, a CommScope Undercarpet Flat Conductor Cable (FCC) 3-553079 (3-conductor) or 3-553820 (5-conductor) may be used to connect a plurality of heating elements 300 within the apparatus 100 and connect between apparatuses 100.

The insert circuitry may also be powered from an external power source. Additional or alternatively, a battery may be included in the insert to provide sufficient power for the electronics and/or microcontrollers on the insert.

The non-heating conductors 301 from the heating element 300 may be connected to the non-heating conductors 403/408 on the insert using conductive terminal couplings or connectors 414/417. For example, foil terminal butt splice connectors, or conductive foils (e.g. copper foils) mechanical riveted or with conductive adhesives (e.g. a conductive acrylic adhesive backing) may be used to connect the leads 301 and the terminal coupling components 403. In some examples, Tyco TERMI-FOIL connectors or CommScope Undercarpet Cabling Splice and Tap Clips may be used. The butt splice connectors may be inserted into the connector pockets above/below the leads 301 on the heating element 300 and crimped to the heating element 300 and insert.

The terminal couplings or connectors 404/407 connectable to a source of power may be selected based on the desired application. For example, the connector 404/407 may be manufactured using Tyco Electronics Termi-foil AMP connectors crimped onto copper foil buses leading to the non-heating conductors 403/408. In preferred embodiments, a junction box, cable gland, molded connector, or other external coupling assembly 406 may enclose the terminal components 403/408 and terminal coupling or connector 404/407 coupled to a short length of cable with a different external power connector.

In preferred embodiments, a sealing end portion consisting of fusing adhesive tape 415 may enclose the terminal coupling components 403/408 and power connector 404/407 that may be coupled to a length of cable with a different external power connector or within a junction box, cable gland, molded covering or other coupling assembly 406. For example, 3M™ Scotch™ 2234 Cable Jacket Repair Tape manufactured of butyl rubber/mastic may be used to electrically seal above and below from water ingress and moisture.

In preferred embodiments, the external power supply connector 404/407 may be part of an insulation piercing foil terminal block as a power coupling assembly 416. For example, a CommScope Power Transition Block 554862 may be used to pierce the insulation and foils of CommScope Flat Conductor Cable (FCC) to terminate for barrel connection of round wires. Additionally a CommScope Power Whip Kit 554181 (not shown) may be used to enclose the power coupling assembly 416 in the same manner as a junction box, cable gland or other coupling 406.

In preferred embodiments, the power supply connector 404/407 includes a connection to the non-heating conductors 301 of the heating element 300 and the grounding strap 211 or conductive covering layer 203/204 of the shell layer 200. The grounding connector 407 may be electrically continuous with the grounding strap 211 or conductive covering layer 203/204 (if present) of the shell 200. Similar to the coupling between terminal components 403/408 and the leads 301, the grounding connection 407 may be connected to the grounding strap 211 or conductive covering layer 203/204 using a foil terminal butt splice connector or conductive foil with a conductive adhesive.

In preferred embodiments, the power supply connector 404/407 may be coupled to a ground fault or residual current device. For example, the connector 404/407 may be coupled to a connector cord with an in-line GFCI rated at 5 mA. The insert may also include an on-board controller 411. The controller 411 may control operation of the heating element 300 when coupled thereto by terminal connections 403. The controller 411 may also control the operation of the insert circuitry, e.g. based on data retrieved from on-board or external sensors.

In preferred embodiments, the control circuitry such as controller 411 may be a hybrid printed electronic on the flexible insert. In other embodiments, the control circuitry may form part of a membrane switch with a junction box or coupling assembly. Control circuitry may be printed on a membrane switch using inks on a stretchable substrate that can later be thermoformed onto the membrane, referred to as In-mold Electronics (IME). In an embodiment of the present invention, the switching membrane may extend through an aperture in the outer shell rather than the junction box alone.

In a preferred embodiment, heating apparatus 100 may use temperature, humidity and/or other sensors. As shown in the example of FIGS. 4D and 4E, for example, the insert includes a thermal sensor 409 and a moisture sensor 410. In the insert of FIG. 4D, temperature sensor 409 and moisture sensor 410 are coupled to the controller 411 (e.g. using printed silver ink circuitry). Alternatively, the sensors 409 and 410 may be connected to an external control unit.

The thermal sensor 409 may also be implemented as a sensor and/or thermal switch. For example, a Brewer Science Inflect™ Thermistor may be used as the thermal sensor 409.

The thermal sensor 409 may be used to measure the temperature at one or more locations in the heating apparatus 100. For example, the thermal sensor 409 may be positioned contacting or adjacent to (i.e. without intervening layers) the heating element 300. Additionally or alternatively, a thermal sensor may be positioned between a thermal insulation layer and the lower layer 103 of the protective covering (e.g. just inward of the lower layer 103) to sense the temperature of a surface to be heated. This may be used to determine the thermal insulation efficiency.

The moisture sensor 410 may be used to measure humidity on the insert circuitry. For example, a Brewer Science Inflect™ Moisture Sensor may be used and connected directly to the insert circuitry.

Additional or alternative sensors may also be used with the heating apparatus 100. For example, force sensors may be included with the insert circuitry to operate as input components. The force sensors may be used to activate/deactivate and/or adjust operational settings of the heating apparatus 100. For example, circular force sensors may be printed onto the insert circuitry.

FIG. 4E shows a thermal sensor 409 on a separate substrate 418 that may also have additional electric circuitry such as other sensors, actuators and conductors brought into the coupling assembly 406.

Output components 412 may also be included in the insert circuitry. For example, LEDs or electroluminescent displays may be included in the insert to provide outputs indicating on/off state, surface temperature, control settings etc. For example, a printed thin-film 4-channel 7-segment electroluminescent display may be used with the insert.

The insert may also include upper and lower insulation layers similar to the heating element 300. The upper and lower insulation layers may substantially enclose and electrically isolate the insert electrical circuitry from other components in the heating apparatus 100 (other than at desired locations). As with the heating element 300, the upper and lower insulation layers can be manufactured from materials exhibiting a thickness and dielectric strength sufficient enough to overcome the voltage breakdown (kV) specification (e.g. 2.5 kV) of the apparatus 100.

In general, the circuitry on insert 107 may be enclosed within waterproof protective layers. However, exposed regions 405 may be left on insert to allow the terminal connections 403 and ground connections 407 to be coupled to other components in heating apparatus 100. The exposed regions may have their perimeters sealed in a waterproof manner to prevent damage to other, unexposed, regions of the insert. As a skilled reader will appreciate, the waterproofing used in a particular implementation of an insert may vary based on the components of the insert, as well as the manner in which the insert is manufactured.

In preferred embodiments, sensors and/or actuators included in insert, such as moisture sensor 410 may need to be exposed to environmental components external to the insert. Accordingly, a waterproof membrane 413 may be provided around the edges of such components (although, the waterproof membrane 413 may be moisture permeable to allow a moisture sensor 410 to function). Where such components extend through additional layers of the heating apparatus (e.g. through apertures 105), the edges of the aperture 105 and sensor member 413 can be sealed using a waterproof sealant or tape 415. For example, 3M™ Scotch™ 2234 Cable Jacket Repair Tape may be used in and around the sensors and actuators as well as the junction box or membrane switch itself.

FIG. 4E shows a hemispherical waterproof membrane 413 containing the humidity and precipitation sensor 410 and LED 412, while acting as an on-off button. On a separate substrate 418, the thermal sensor 409 may be positioned with additional electric circuitry such as other sensors, actuators and conductors brought into the coupling assembly 406. Additionally, an electric relay 419 may be included within the coupling assembly 406 electrically connected to the insert circuit and controller to turn on/off the apparatus.

The insert 107 may typically be inserted into heating apparatus 100 just below the first upper layer 102. This may allow components from the insert, such as junction boxes or coupling assemblies 406 and/or sensors to extend through apertures 105 without interfering with the operation of other layers in the heating apparatus 100.

It should be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "an embodiment," "embodiment," "embodiments," "the embodiment," "the embodiments," "one or more embodiments," "preferred embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The present invention has been described here by way of example only, while numerous specific details are set forth herein in order to provide a thorough understanding of the exemplary embodiments described herein. However, it will be understood by those of ordinary skill in the art that these embodiments may, in preferred embodiments, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

I claim:

1. A planar electrical heating apparatus operable using AC or DC power comprising:
    an outer shell with an upper shell layer and a lower shell layer defining an internal cavity therebetween having an upper inner cavity surface facing a lower inner cavity surface, each upper and lower inner cavity surface having a first attachment region in which the upper inner cavity surface and the lower inner cavity surface are attached along a periphery and a second attachment region in which the upper inner cavity surface and the lower inner cavity surface are detachably attached over a central area of the internal cavity, wherein the first attachment region has a first bond between the upper inner cavity surface and the lower inner cavity surface and the second attachment region has a second bond between the upper inner cavity surface and the lower inner cavity surface, the first bond sealing the outer shell to the lower shell and the second bond being unsealed between the upper inner cavity surface and the lower inner cavity surface;
    a heating element positionable within the internal cavity between the upper shell layer and lower shell layer, the heating element having a heating conductor and a first and a second non-heating conductor;
    a first connector end portion secured to the first and the second non-heating conductors for coupling to an electrical power supply; and
    a sealing end portion enclosing the connector end portion for electrical isolation and protection from water ingress.

2. The planar electrical heating apparatus of claim 1, wherein the heating element is permanently or detachably attached in the first attachment region between the upper inner cavity surface and lower inner cavity surface and wherein the upper and lower shell layers are detachable over a portion of the upper and lower inner cavity surface within the second attachment region defining an opening to the internal cavity through which the heating conductor and the non-heating conductors are accessible.

3. The planar electrical heating apparatus of claim 1, wherein the heating element is positioned and detachable within the internal cavity in the second attachment region between the upper inner and lower inner cavity surfaces and wherein the upper and lower shell layers are permanently or detachably attached and sealed to each other along a first portion of a perimeter of the upper and lower inner cavity surface along the first attachment region, and wherein the upper and lower shell layers are detachable within the second attachment region defining an opening to the internal cavity through which the heating element, the heating conductor and the non-heating conductors are accessible.

4. The planar electrical heating apparatus of claim 2, wherein the upper and/or lower outer shell layers extends beyond a periphery of the heating element, and the first connector end portion, and the sealing end portion, and the upper shell layer and/or lower shell layer folded onto the other or joined onto each other so as to seal the apparatus.

5. The planar electrical heating apparatus of claim 3, wherein the upper and/or lower outer shell layers extends beyond a periphery of the heating element, and the first connector end portion, and the sealing end portion, and the upper shell layer and/or lower shell layer folded onto the other or joined onto each other so as to seal the apparatus.

6. The planar electrical heating apparatus of claim 1, wherein the upper outer shell layer is configured to cover the heating element, and the lower shell layer is a surface of a portion of an object to which the apparatus is applied for installation.

7. The planar electrical heating apparatus of claim 1, wherein the heating element further comprising:
    the heating conductor is comprised of electrically resistive materials selected from the group consisting of inks, coatings, elastomerics, concretes, threads, or textiles; and
    the first and the second non-heating conductors each comprised of a metal selected from the group consisting of inks, coatings, foils, busbars, wires or threads.

8. The planar electrical heating apparatus of claim 7, wherein the heating conductor is further comprised of a dual-phase material having a first phase, the first phase including a first region in a temperature-resistance curve of varying resistance with temperature providing a self-regulation function and a second phase of infinite resistance with, the second phase including a second region in the temperature resistance curve with higher resistance than the first region, the second phase providing a permanent open circuit condition, the dual-phase material configured to transition from the first phase to the second phase as the temperature increases for protection as an electric fuse.

9. The planar electrical heating apparatus of claim 7, further comprising a second heating conductor and a third and fourth non-heating conductor stacked vertically and electrically isolated from the first heating conductor wherein the second heating conductor is alternatively and separately operated at a different surface power flux density at the rated AC or DC voltage of the first heating conductor.

10. The planar electrical heating apparatus of claim 1, further comprising a thermal layer positioned within the internal cavity between the upper or lower shell layers and the heating element wherein the thermal layer is permanently or detachably attached to the upper shell layer or the lower shell layer and detachable from the heating element.

11. The planar electrical heating apparatus of claim 10, wherein the thermal layer is further comprised of material having high thermal conductivity, and high thermal capacitance.

12. The planar electrical heating apparatus of claim 10, wherein the lower shell layer is a thermal layer.

13. The planar electrical heating apparatus of claim 1, further comprising an electric insert receivable and positionable within the internal cavity, the electric insert receivable comprising:
    an electric circuit with an upper and lower insulating layer and a first and a second non-heating conductor thereon or therewithin;
    a first connector end portion thereon or therewithin the upper or lower insulating layer, the first connector end portion connectable to the first and the second non-heating conductor of the electric circuit and a source of power;
    a second connector end portion thereon or therewithin the upper or lower insulating layer, the first connector end portion connectable to the first and the second non-heating conductor of the electric circuit and the first and the second non-heating conductor of the heating element;
    a sealing end portion enclosing the first and second connector end portions secured attachably and sacrificially detachable around the first and the second connector end portion for electrical isolation and protection from water ingress; and
    wherein the second connector end portion is connected to the first and the second non-heating conductor of the heating element and the first connector end portion connected to an electrical power supply.

14. The planar electrical heating apparatus of claim 13, wherein the non-heating electric circuit conductors are perpendicular to an edge and a surface of the electric insert.

15. The planar electrical heating apparatus of claim 13, wherein the non-heating electric circuit conductors are parallel and extend continuously along a first length of the electric insert.

16. The planar electrical heating apparatus of claim 13, wherein the electric insert overlies at least a portion of the heating element.

17. The planar electrical heating apparatus of claim 13, wherein the electric insert is coplanar with the heating element.

18. The planar electrical heating apparatus of claim 13, wherein the electric insert or the first connector end portion extends through an aperture in the upper shell layer or lower shell layer.

19. The planar electrical heating apparatus of claim 13, wherein the electric insert or the first connector end portion extends beyond a periphery of the apparatus through an aperture between the upper shell layer and the lower shell layer.

20. The planar electrical heating apparatus of claim 13, wherein the upper shell layer or lower shell layer extend beyond a periphery of the heating element, the electric insert, the first and the second connector end portion of the electric circuit, the sealing end portion of the electrical circuit and the planar heating apparatus, the upper shell layer or lower shell layer folded onto the other or joined onto each other to seal the apparatus.

21. The planar electrical heating apparatus of claim 13, further comprising a junction box, side entry gland, or molded covering enclosing the first connector end portion, each comprising:
- a first connector end portion assembly consisting of die punched insulation piercing terminal end portion connectable to non-heating conductors of electric insert and quick disconnect tab or barrel terminal end portion connectable to conductors of an external power source;
- a strain relief fitting or locking receptacle for cable to an external power source; and
- a sealing end portion for attaching the junction box, side entry gland or molded covering to the planar heating apparatus.

22. The planar electrical heating apparatus of claim 13, wherein the molded covering is the sealing end portion which encloses the first and second connector end portions, and is secured attachably and sacrificially detachable around the first and the second connector end portion for electrical isolation and protection from water ingress.

23. The planar electrical heating apparatus of claim 13, further comprising:
- an electric control circuit having a plurality of conductors operable using AC or DC power;
- an electric sensor for sensing surface temperature, ambient temperature, relative humidity, precipitation/moisture, line current, leakage current, or force measurements connected to the conductors of the electric control circuit; and
- an electric actuator for operating inputs displaying outputs, on/off state, surface temperature, ambient temperature, relative humidity, precipitation/moisture, line current, leakage current, power consumption, or control settings connected to the conductors of the electric control circuit.

24. The planar electrical heating apparatus of claim 10, wherein the thermal layer comprises a material having high thermal conductivity and high thermal capacitance.

25. The planar electrical heating apparatus of claim 10, wherein the thermal layer comprises a material having low thermal conductivity, high thermal capacitance, and low transparency to thermal radiation.

26. The planar electrical heating apparatus of claim 10, wherein the thermal layer comprises a material having low thermal conductivity, low thermal capacitance, and low transparency to thermal radiation.

27. The planar electrical heating apparatus of claim 10, wherein the thermal layer is further comprised of material having low thermal conductivity, high thermal capacitance and low transparency to thermal radiation.

28. The planar electrical heating apparatus of claim 10, wherein the thermal layer is further comprised of material having low thermal conductivity, low thermal capacitance and low transparency to thermal radiation.

29. An electric insert for a planar electrical heating apparatus with an outer shell and an internal cavity, the internal cavity including an upper inner cavity surface and a lower inner cavity surface, the electric insert receivable and positionable within the internal cavity, the outer shell including an upper shell layer and a lower shell layer defining the internal cavity, wherein the upper shell layer and the lower shell layer are attachable using a first bond along the periphery and attachable using a second bond between the upper inner cavity surface and the lower inner cavity surface, the first bond sealing the outer shell to the lower shell and the second bond being unsealed between the upper inner cavity surface and the lower inner cavity surface, the electric insert comprising:
- an electric circuit with an upper and lower insulating layer and a first and a second non-heating conductors thereon or therewithin;
- a first connector end portion thereon or therewithin the upper or lower insulating layer, the first connector end portion connectable to the first and the second non-heating conductors of the electric circuit and a source of power;
- a second connector end portion thereon or therewithin the upper or lower insulating layer, the first connector end portion connectable to the first and the second non-heating conductors of the electric circuit and the first and the second non-heating conductors of the heating element;
- a sealing end portion enclosing the first and the second connector end portions secured attachably and sacrificially detachable around the first and the second connector end portion for electrical isolation and protection from water ingress; and
- wherein the second connector end portion is connected to the first and second non-heating conductors of the heating element and the first connector end portion connected to an electrical power supply.

* * * * *